(12) United States Patent
Takeshita

(10) Patent No.: US 6,278,844 B1
(45) Date of Patent: *Aug. 21, 2001

(54) OPTICAL APPARATUS

(75) Inventor: Shigeru Takeshita, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/420,104

(22) Filed: Oct. 18, 1999

(30) Foreign Application Priority Data

Oct. 22, 1998 (JP) .................................................. 10-301489

(51) Int. Cl.⁷ .............................. G03B 17/04; G02B 15/14
(52) U.S. Cl. ............................ 396/85; 396/349; 396/448; 359/696
(58) Field of Search ................................. 396/85, 86, 87, 396/72, 349, 448; 348/358; 359/696, 697, 698

(56) References Cited

U.S. PATENT DOCUMENTS 5,905,918 * 5/1999 Nakamura et al. .................... 396/87

* cited by examiner

*Primary Examiner*—W. B. Perkey
(74) *Attorney, Agent, or Firm*—Robin, Blecker & Daley

(57) ABSTRACT

An apparatus, such as an image pickup apparatus, includes an optical unit, and an operating device which brings the optical unit to a usage start position by drawing in the optical unit after drawing out the optical unit from a stowage position. The operating device causes a focal-length varying operation to be performed by further drawing in the optical unit from the usage start position.

20 Claims, 19 Drawing Sheets

ROTATING DIRECTION DURING DRAWING-OUT

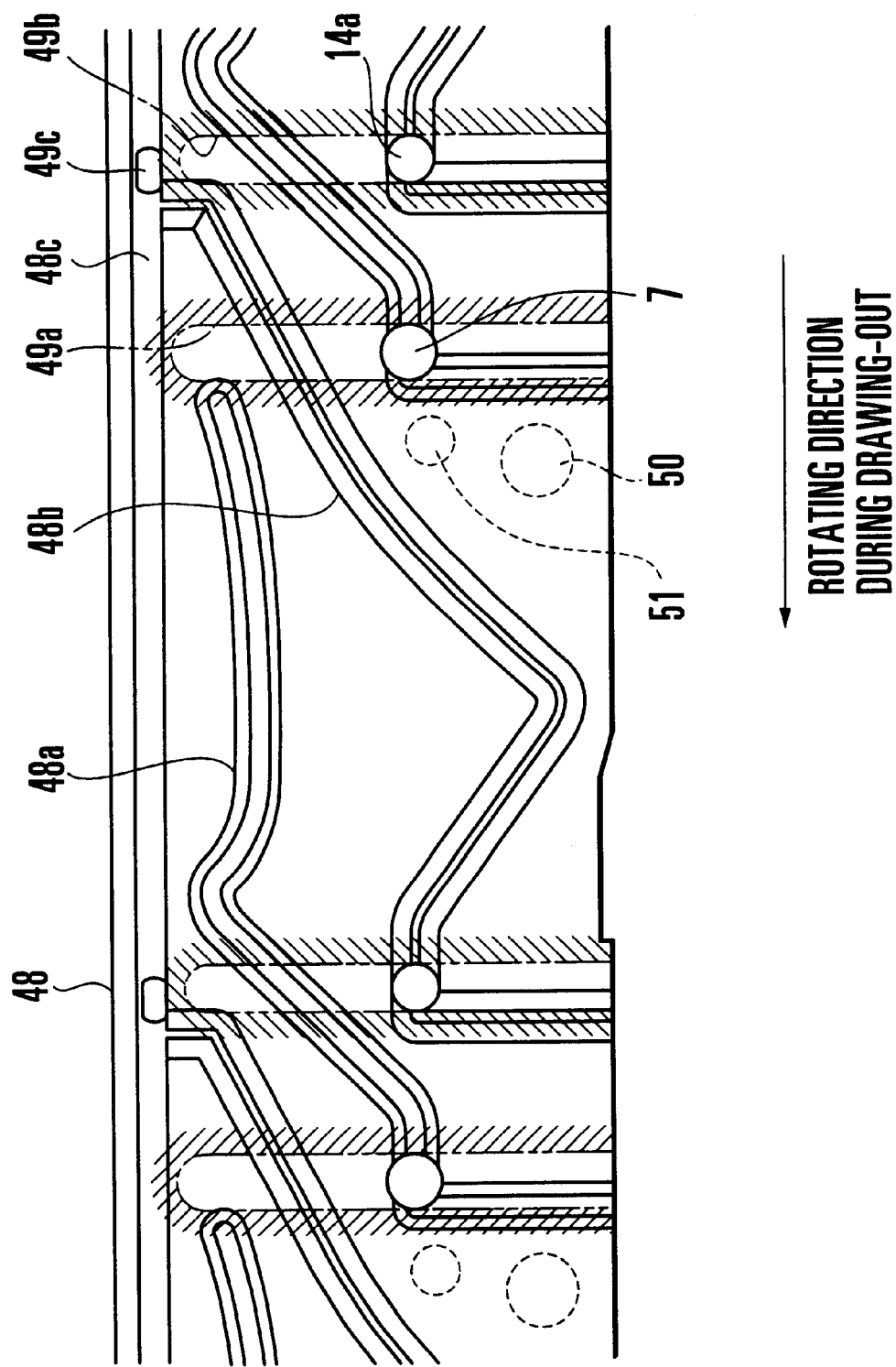

FIG. 11(a)   FIG. 11(b)
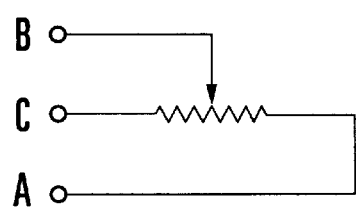
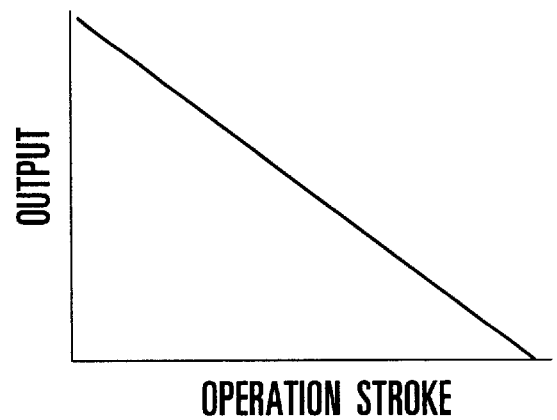
FIG. 12
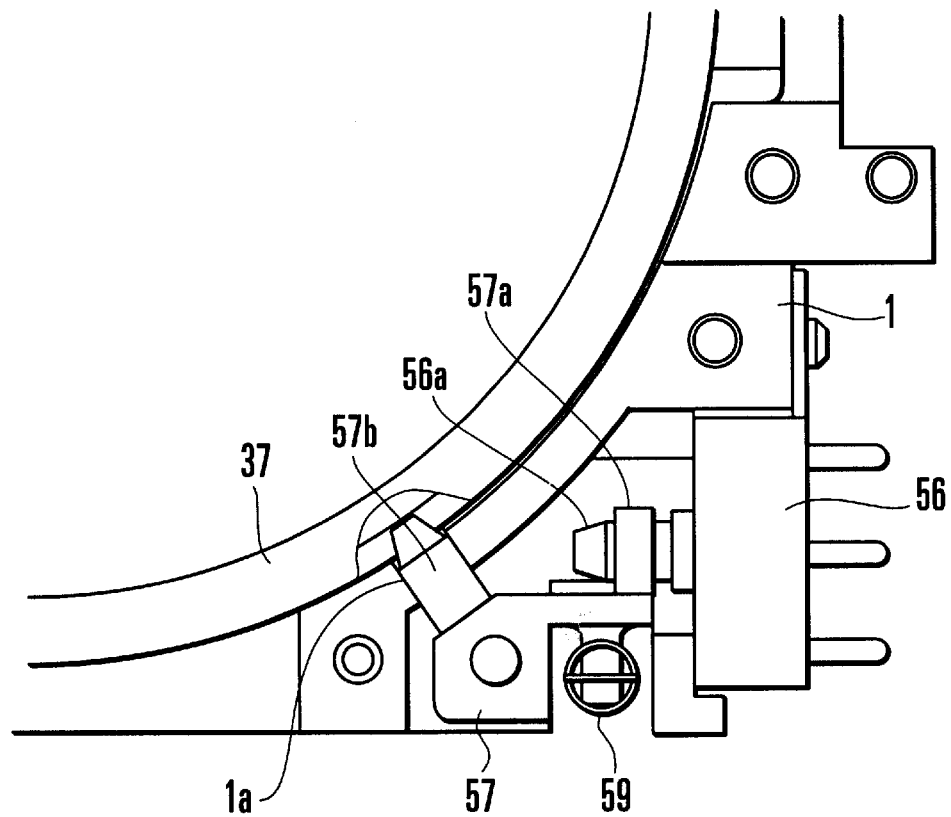

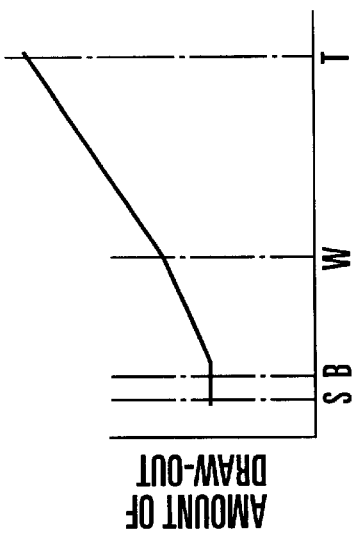
FIG.16(d)
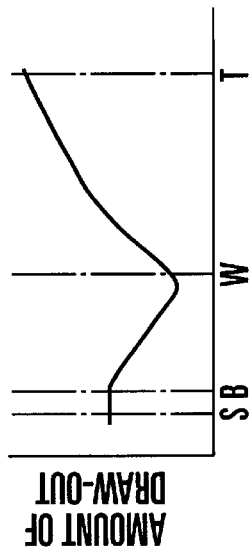
FIG.16(e)
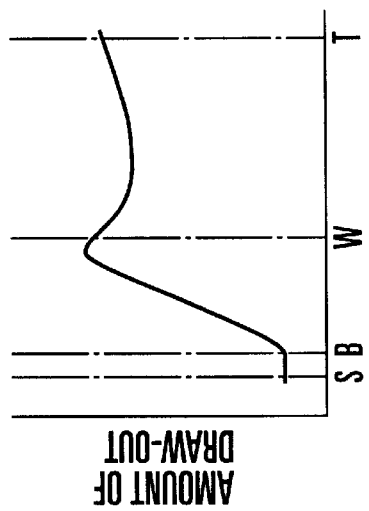
FIG.16(b)
FIG.16(c)
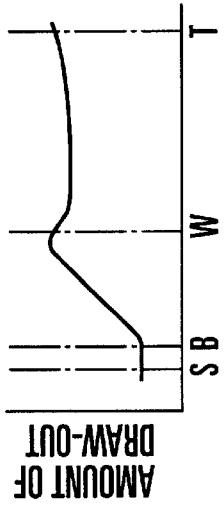
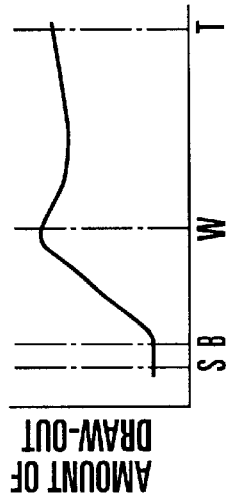
FIG.16(a)

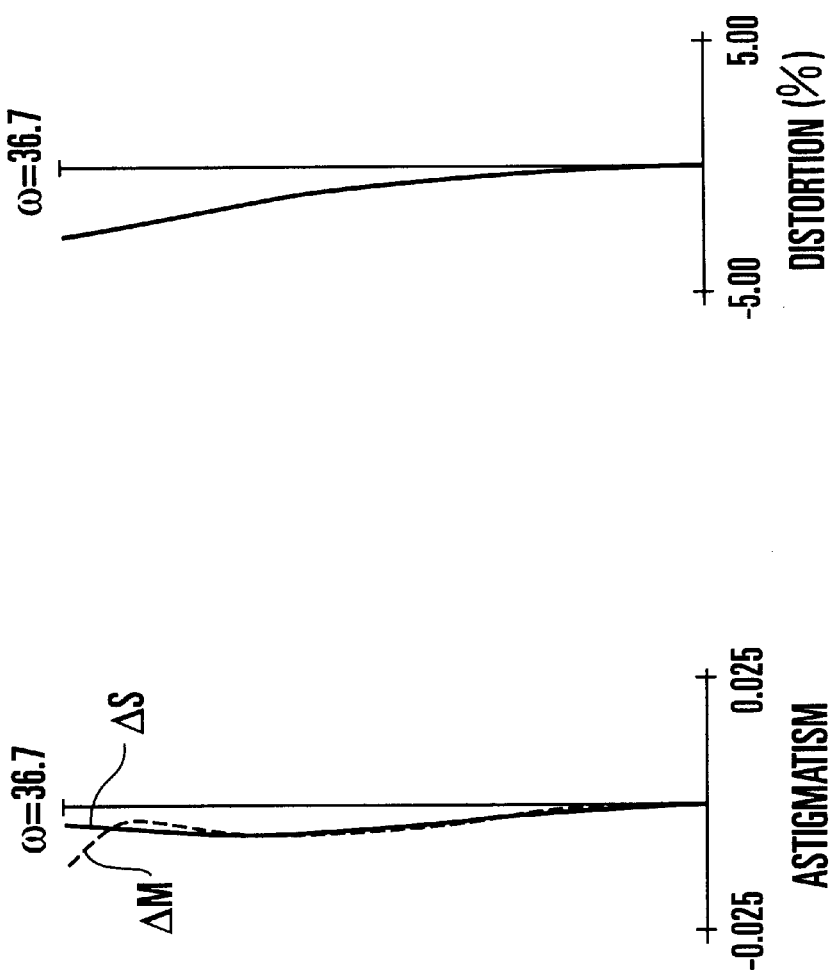
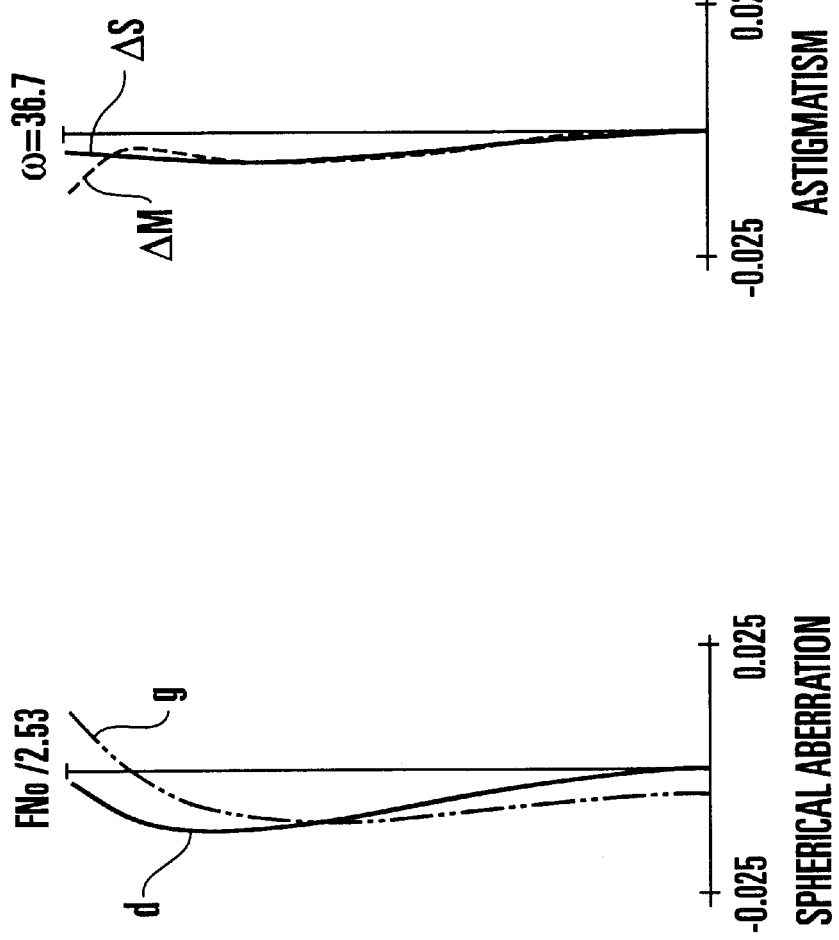

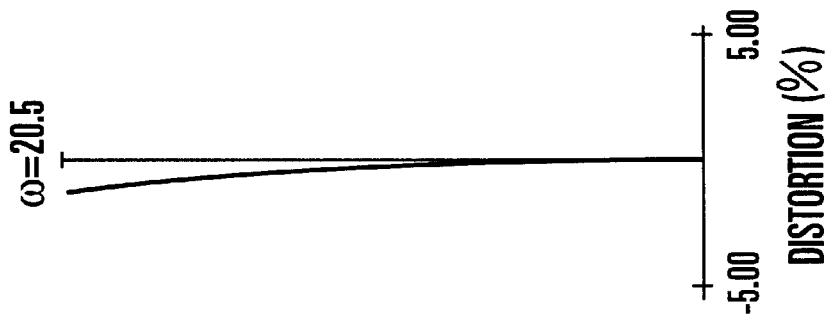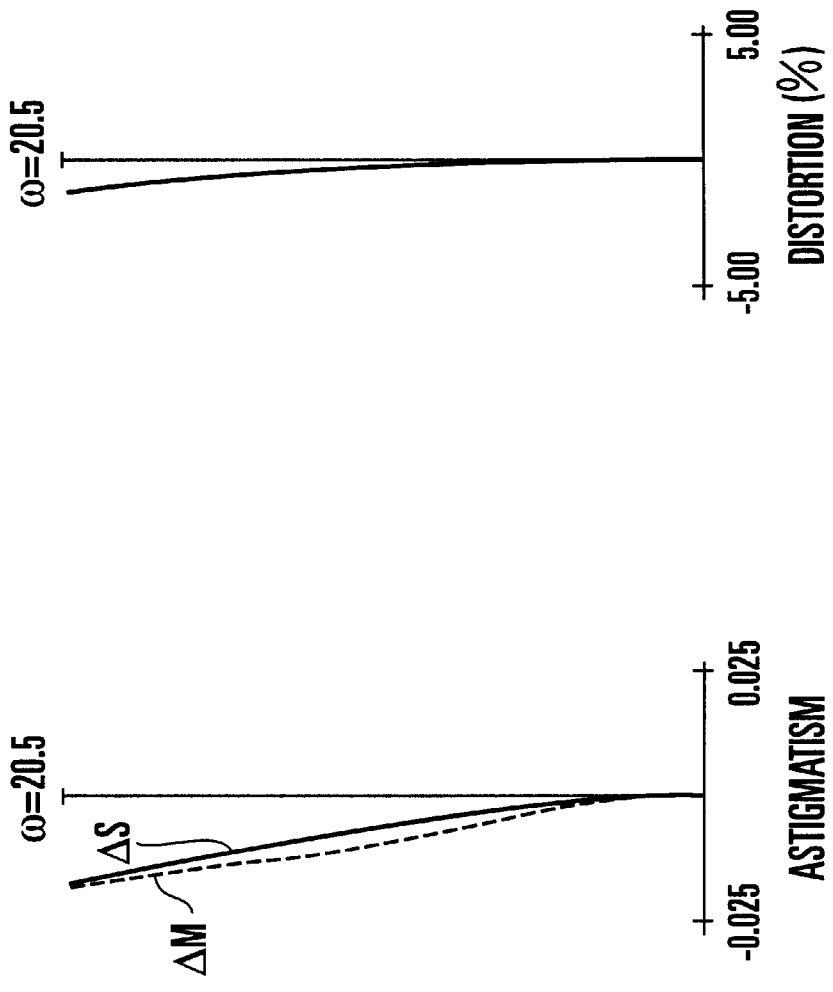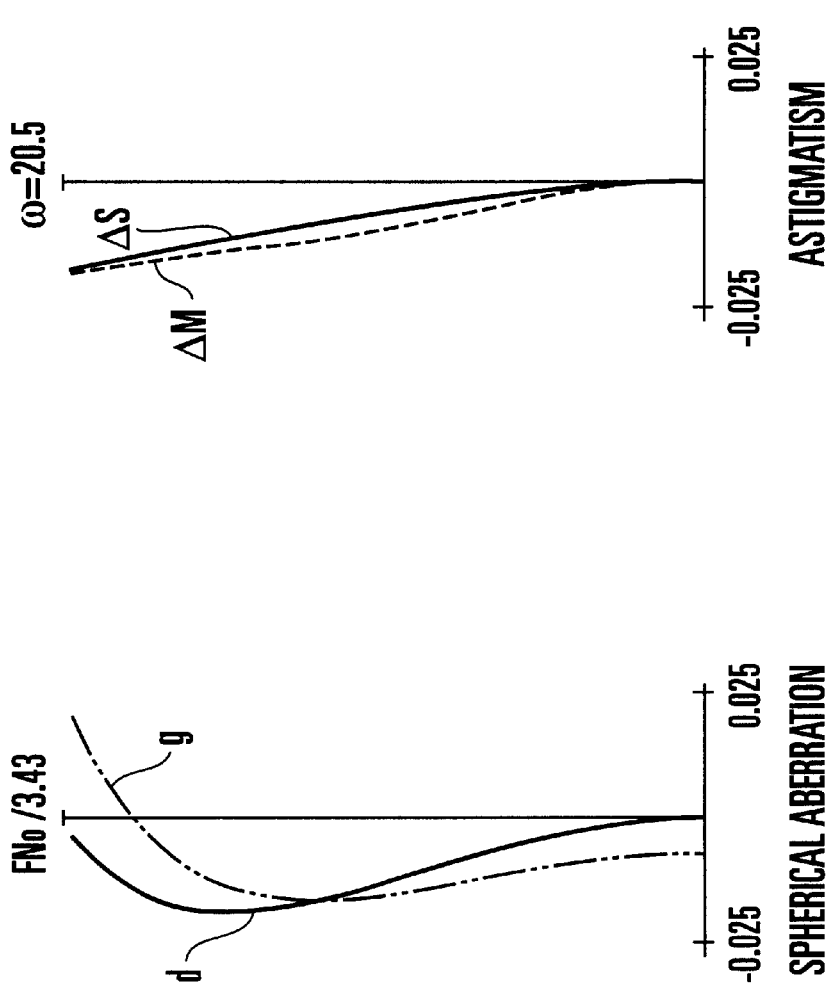

FIG. 22

NUMERICAL EXAMPLE $f = 1.00 - 2.51$  $Fno = 1 : 2.53 - 3.89$  $2\omega = 73.54 - 33.19$

| | | | |
|---|---|---|---|
| R1 = 4.9822 | D1 = 0.2740 | N1 = 1.67790 | $\nu 1$ = 55.3 |
| R2 = 1.4332 | D2 = 0.4235 | | |
| R3 = 5.5404 | D3 = 0.1495 | N2 = 1.77250 | $\nu 2$ = 49.6 |
| R4 = 1.4714 | D4 = 0.3338 | | |
| R5 = 1.9929 | D5 = 0.4484 | N3 = 1.84666 | $\nu 3$ = 23.8 |
| R6 = 4.9822 | D6 = VARIABLE | | |
| R7 = ∞ (STOP) | D7 = 0.0996 | | |
| R8 = 1.2359 | D8 = 0.4235 | N4 = 1.83400 | $\nu 4$ = 37.2 |
| R9 = 8.2906 | D9 = 0.0583 | | |
| R10 = -4.7936 | D10 = 0.3986 | N5 = 1.80518 | $\nu 5$ = 25.4 |
| R11 = 1.1086 | D11 = 0.0511 | | |
| R12 = 1.6379 | D12 = 0.3737 | N6 = 1.69350 | $\nu 6$ = 53.2 |
| R13 = -2.9030 | D13 = VARIABLE | | |
| R14 = 3.1077 | D14 = 0.3737 | N7 = 1.58313 | $\nu 7$ = 59.4 |
| R15 = -24.9110 | D15 = 0.2491 | | |
| R16 = ∞ | D16 = 0.8719 | N8 = 1.51633 | $\nu 8$ = 64.1 |

R1 : ASPHERIC SURFACE $B = -4.30972 \times 10^{-2}$  $C = 5.65407 \times 10^{-3}$  $D = -3.13224 \times 10^{-2}$ $E = 1.82623 \times 10^{-2}$  $F = -6.59455 \times 10^{-3}$

R13 : ASPHERIC SURFACE $B = 3.22721 \times 10^{-2}$  $C = 1.83486 \times 10^{-2}$  $D = -3.44518 \times 10^{-2}$ $E = -4.57574 \times 10^{-2}$  $F = -1.09165 \times 10^{-3}$

R14 : ASPHERIC SURFACE $B = -6.09119 \times 10^{-3}$  $C = -2.89751 \times 10^{-3}$  $D = 8.16177 \times 10^{-2}$ $E = -5.23722 \times 10^{-3}$  $F = 0$

| FOCAL LENGTH / VARIABLE SEPARATION | 1.00 | 2.00 | 2.51 |
|---|---|---|---|
| D 6 | 3.07 | 0.96 | 0.53 |
| D 13 | 0.93 | 2.35 | 3.10 |

OPTICAL APPARATUS

BACKGROUND OF THE INVENTION

1. Field of the Invention

The present invention relates to an optical apparatus, such as a camera, capable of moving an optical system between a usage position and a stowage position.

2. Description of Related Art

In conventional cameras performing a magnification-varying action and a focus-adjusting action by moving a plurality of lens groups in the optical axis direction, there is known a camera which is arranged to move the lens groups to a stowage position in which the lens groups are stowed within a camera body when the camera is not being used for photo-taking, so as to improve the portability of the camera. Such a so-called lens-barrel-stowable type zoom camera is designed, in general, for photography for use with 35 mm film or the like.

Unlike the prior known example described above, cameras using solid-state image pickup elements, such as video cameras and electronic still cameras, because of necessarily having a low-pass filter, a color correction filter and other optical members disposed between the most rear end of the lens and the image pickup element, have the necessity of using a lens having a relatively-long back focal distance. Further, in the case of using the image pickup elements for colors, to avoid occurrence of colored shadings, it is desired that the lens has good telecentric characteristics in the image space.

With the requirements of elongating the back focal distance and of making the telecentric characteristics good, when fulfilling them at once, a lens system is proposed in which, for the zooming purposes, the front lens element is moved in a reciprocating fashion with the locus convex toward the image side.

However, with the use of such a lens system, to make up the so-called stowable type lens barrel, a necessity arises in that the lens barrel is first monotonously drawn out from the stowage position to the photo-taking position and, upon arrival at the photo-taking position, the drawing direction of the lens barrel is reversed. For this reason, the lens barrel has to be made large. Moreover, as the completion of the drawing movement of the lens barrel is immediately followed by the start of the reverse movement for the magnification-varying action, there is a high possibility of causing an increase of driving load.

BRIEF SUMMARY OF THE INVENTION

In accordance with one aspect of the invention, there is provided an apparatus, such as an image pickup apparatus, comprising an optical unit, and an operating device which brings the optical unit to a usage start position by drawing in the optical unit after drawing out the optical unit from a stowage position, the operating device causing a focal-length varying operation to be performed by further drawing in the optical unit from the usage start position, so that it is possible to adequately perform the focal-length varying operation after the optical unit is moved from the stowage position to the usage start position.

The above and other aspects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 10 is a development view showing the inner side of a moving cam ring shown in FIG. 1.

FIGS. 11(a) and 11(b) are diagrams showing a characteristic of a linear sensor shown in FIG. 1.

FIG. 12 is a front view showing the linear sensor and parts therearound shown in FIG. 1.

FIGS. 16(a) to 16(e) are diagrams for explaining the loci of cams and the lens barrel shown in FIG. 1.

FIGS. 19(a) to 19(c) are diagrams showing the various aberrations of the optical system shown in FIG. 18.

FIGS. 20(a) to 20(c) are diagrams showing the various aberrations of the optical system shown in FIG. 18.

FIG. 22 is a diagram showing data of a numerical example of the optical system shown in FIG. 18.

DETAILED DESCRIPTION OF THE INVENTION

Hereinafter, a preferred embodiment of the invention will be described in detail with reference to the drawings.

Figure 18:
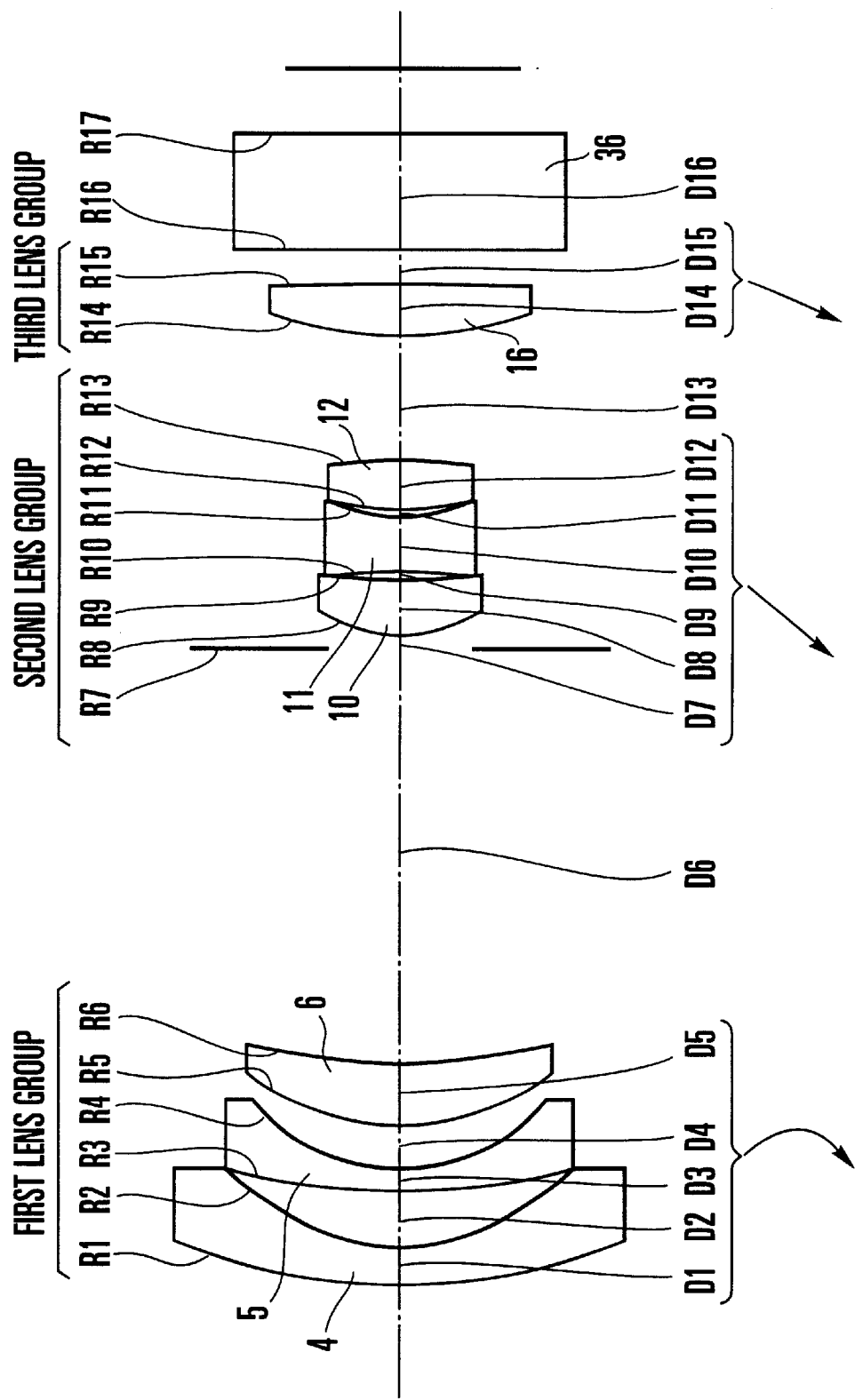
FIG. 18 is a longitudinal sectional view showing the construction and arrangement of an optical system according to the embodiment of the invention.
Figure 21C:
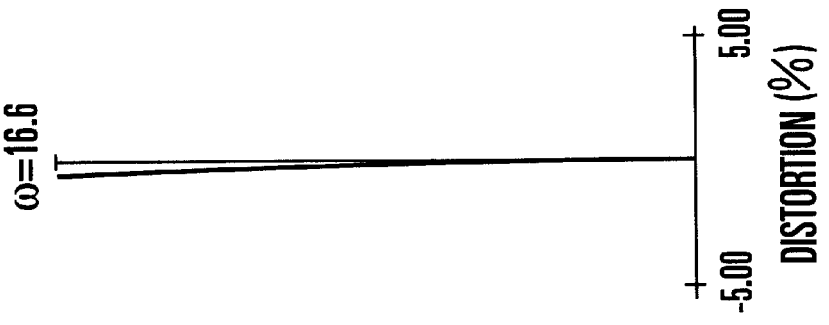
FIGS. 21(a) to 21(c) are diagrams showing the various aberrations of the optical system shown in FIG. 18.
Figure 21B:
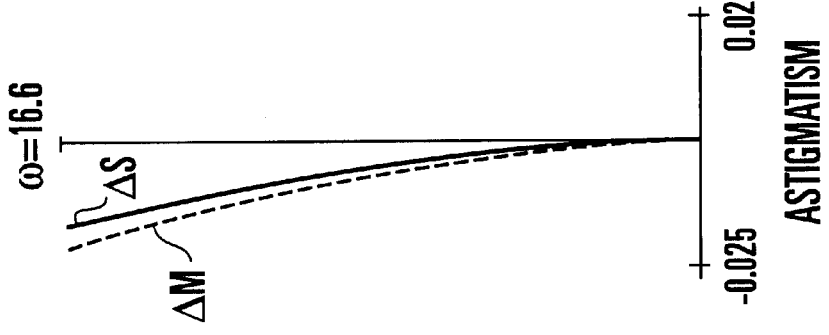
Figure 21A:
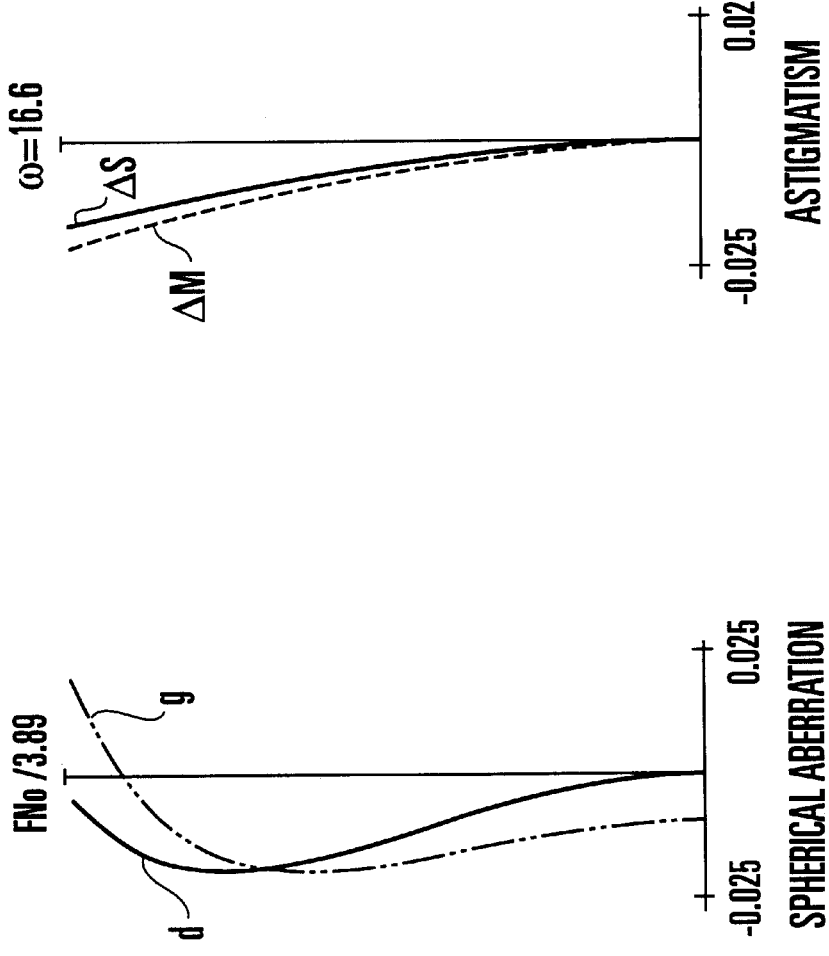

FIG. 18 is a longitudinal sectional view showing the construction and arrangement of an optical system according to the embodiment of the invention.

A zoom lens, which serves as the optical system according to the embodiment, includes, in order from the object side to the image side, a first lens group of negative refractive power, a second lens group of positive refractive power and a third lens group of positive refractive power, totaling three lens groups. During zooming from the wide-angle end to the telephoto end, the first lens group makes a reciprocating motion convex toward the image side and the second lens group moves toward the object side. The third lens group is movable during zooming.

The zoom lens according to the embodiment has such a basic feature that the negative first lens group and the positive second lens group constitute a so-called wide-angle short zoom system. The movement of the second lens group varies the focal length, and the shift of an image plane is compensated for by moving the negative first lens group back and forth.

The positive third lens group contributes to an increase of the refractive power of the complete lens that accompanies with the reduction of the size of the image pickup element, assuring reduction of the refractive power of the short zoom system composed of the first and second lens groups. With this arrangement, particularly, for the constituent lenses of the first lens group, the produced amount of aberrations is lessened to thereby achieve a good optical performance. Also, particularly, for the image pickup apparatus using a solid-state image pickup element, the entire lens system has to be made telecentric in the space of forming an image. This arrangement is achieved by having the positive third lens group to play a role of the field lens.

Also, a stop is put in the second lens group at the frontmost position thereof, shortening the distance in the wide-angle end between the entrance pupil and the first lens group. The diameters of the constituent lenses in the first lens group are thus suppressed to a minimum. At the same time, the first lens group and the third lens group, which are respectively disposed on both sides of the stop placed on the object side of the positive second lens unit, are arranged to cancel various off-axial aberrations. Therefore, without having to increase the number of constituent lenses, a good optical performance can be obtained.

Further, in the present embodiment, the negative first lens group is constructed with, in order from the object side to the image side, two negative lenses 4 and 5 having concave surfaces facing the image side and a positive lens 6 having a convex surface facing the object side. The positive second lens group is constructed with, in order from the object side to the image side, a positive lens 10, a negative lens 11 and a positive lens 12, totaling three lenses. The positive third lens group is constructed with a positive lens 16.

In such a manner, all the lens groups are designed so that the desired refractive power arrangement and the aberration correction are made compatible. With the performance kept good, improvements of the compact form of the lens system are achieved. As the first lens group is given a role of focusing the off-axial principal ray to the center of the stop in the pupil image, particularly for the wide-angle region, the amount of refraction of the off-axial principal ray is large. Therefore, off-axial aberrations, especially, astigmatism and distortion, tend to occur in the first lens unit.

Accordingly, like the ordinary wide-angle lens, the minus-plus power arrangement is employed that permits the diameter of the frontmost lens to be suppressed against increasing, and, in addition, what bears mainly a negative refractive power is made two in number, that is, distributed over two negative lenses 4 and 5.

The first lens group has an aim to minimize the off-axial aberrations which are produced by the refraction of the off-axial principal ray. For this purpose, all constituent lenses of the first lens group take forms approximate to the concentric spheres with a common center at the center of the stop. The positive second lens group is in the form of a so-called triplet. Since the second lens group moves much long a distance, the second lens group is deprived in itself of spherical aberration and coma to some extent, so that the machining tolerances that cause the lens members to be assembled out of exact axial alignment with one another do not lead to detract the quality of finish products. The front positive lens 10 in the second lens group has its front surface made convex toward the object side lest the off-axial principal ray after having emerged from the first lens group is refracted greatly to produce many off-axial aberrations. Further, the negative lens 11 is made to have a concave surface facing the image side. The concave surface of the negative lens forms a negative air lens in conjunction with a subsequent surface, i.e., a convex front surface of the rear positive lens 12. The negative air lens is used to correct the spherical aberration that increases with an increase of the aperture ratio. The positive third lens group has also the role of a field lens for making the lens system telecentric in the image space.

Also, in order that the lens members in each lens group are limited to a fewer number and further improvements of the optical performance are achieved, in the present embodiment, aspheric surfaces are effectively introduced. In actual practice, as shown in FIG. 18, the first negative lens 4 in the first lens group is made aspherical with its front surface formed to such a shape that a positive refracting power becomes progressively stronger toward the margin, thereby correcting astigmatism and distortion, particularly, in the wide-angle region. The positive lens 16 constituting the third lens group has its front surface of such an aspheric shape that a positive refracting power becomes progressively weaker toward the margin, thereby contributing to correction of various off-axial aberrations throughout the entire zooming range. With regard to distortion, it is usual that the barrel type in the wide-angle end gives rise to a problem. So, in the present embodiment, with the help of the aspheric surface in the first lens group, the correction of the distortion is made not only in the wide-angle end, but also throughout the entire zooming range.

When focusing is performed onto a close object with the use of the zoom lens according to the present embodiment, the third lens group is axially moved toward the object side to obtain good performance.

A numerical example of the optical system according to the present embodiment is shown in FIG. 23. In the table of numerical data in FIG. 23, assuming that "i" represents the consecutive number from the object side, Ri is the radius of curvature of the lens surface, Di is the axial thickness or air separation between the i-th and (i+1)st surfaces, and Ni and vi are respectively the refractive index for the spectral d-line and the Abbe number. Also, the last two surfaces define a glass member such as face plate. The shape of an aspheric surface is expressed with its axial deviation "x" from the front vertex at a height "h" from the optical axis by the following equation:

$$x=R\{1-\sqrt{1-h^2R^2}\}+Bh^4+Ch^6+Dh^8+Eh^{10}+Fh^{12}$$

where R is the radius of the osculating sphere, and B, C, D, E and F are the aspheric coefficients.

The numerical example of the optical system according to the present embodiment is a zoom lens having a range of 2.5 and an aperture ratio of 2.8–4.0 or thereabout in F-number. In addition, FIGS. 19(a) to 19(c), FIGS. 20(a) to 20(c) and FIGS. 21(a) to 21(c) are graphic representations of the aberrations of the zoom lens in the numerical example.

Figure 1:
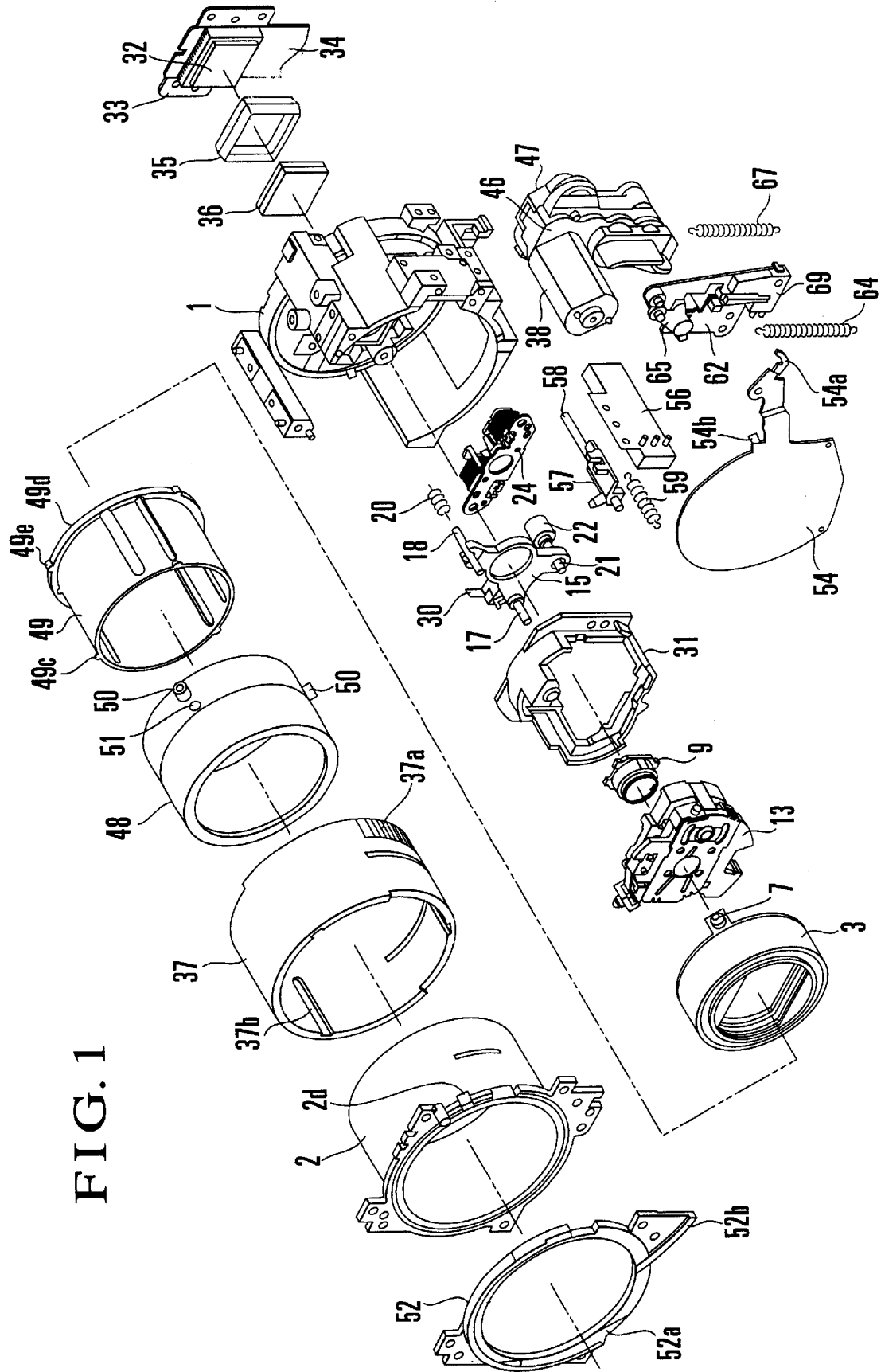
FIG. 1 is an exploded perspective view showing a lens barrel part of a camera according to an embodiment of the invention.
Figure 2:
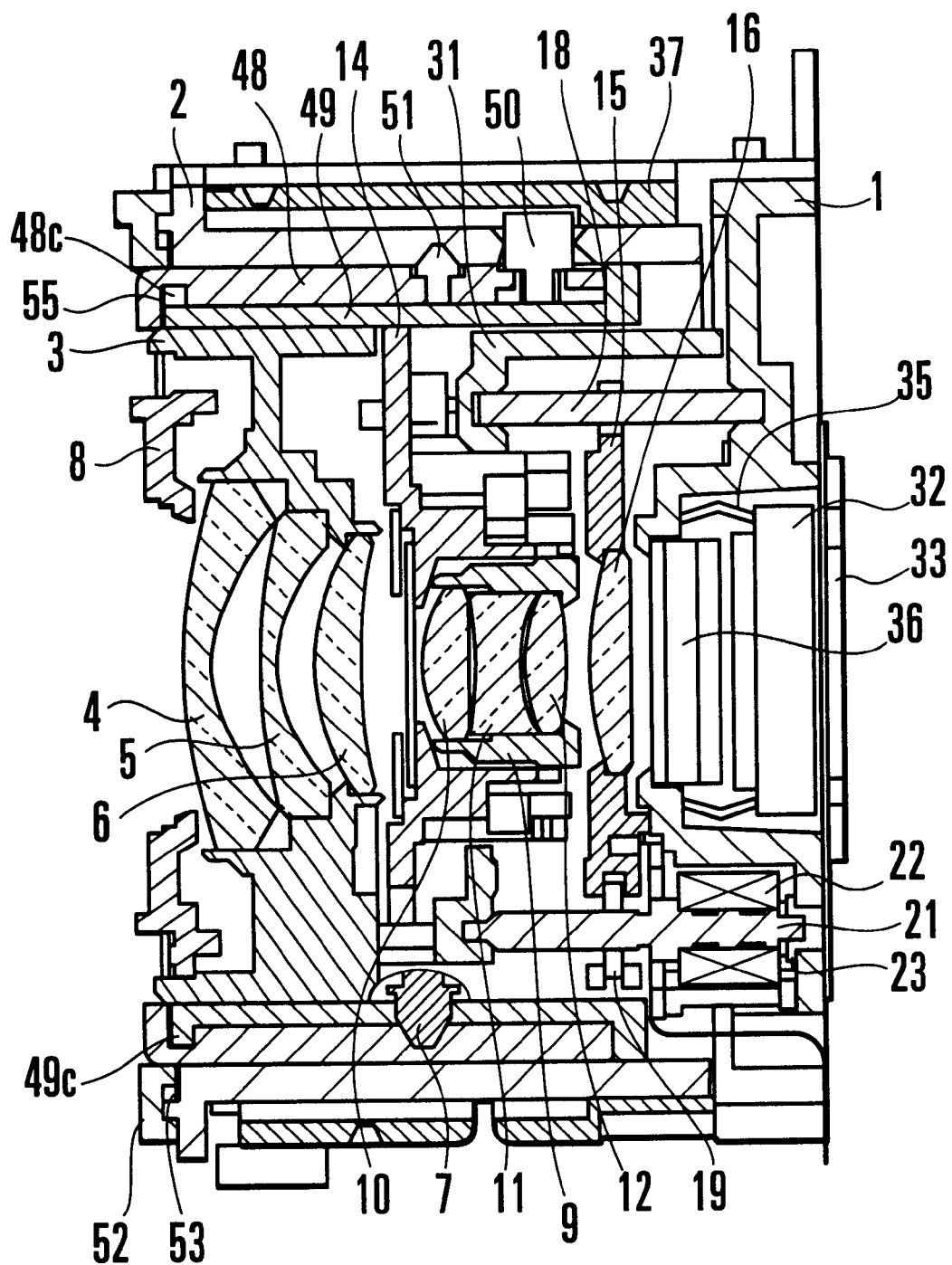
FIG. 2 is a sectional view taken across a central part of the lens barrel shown in FIG. 1 when the lens barrel is in a stowage position.
Figure 3:
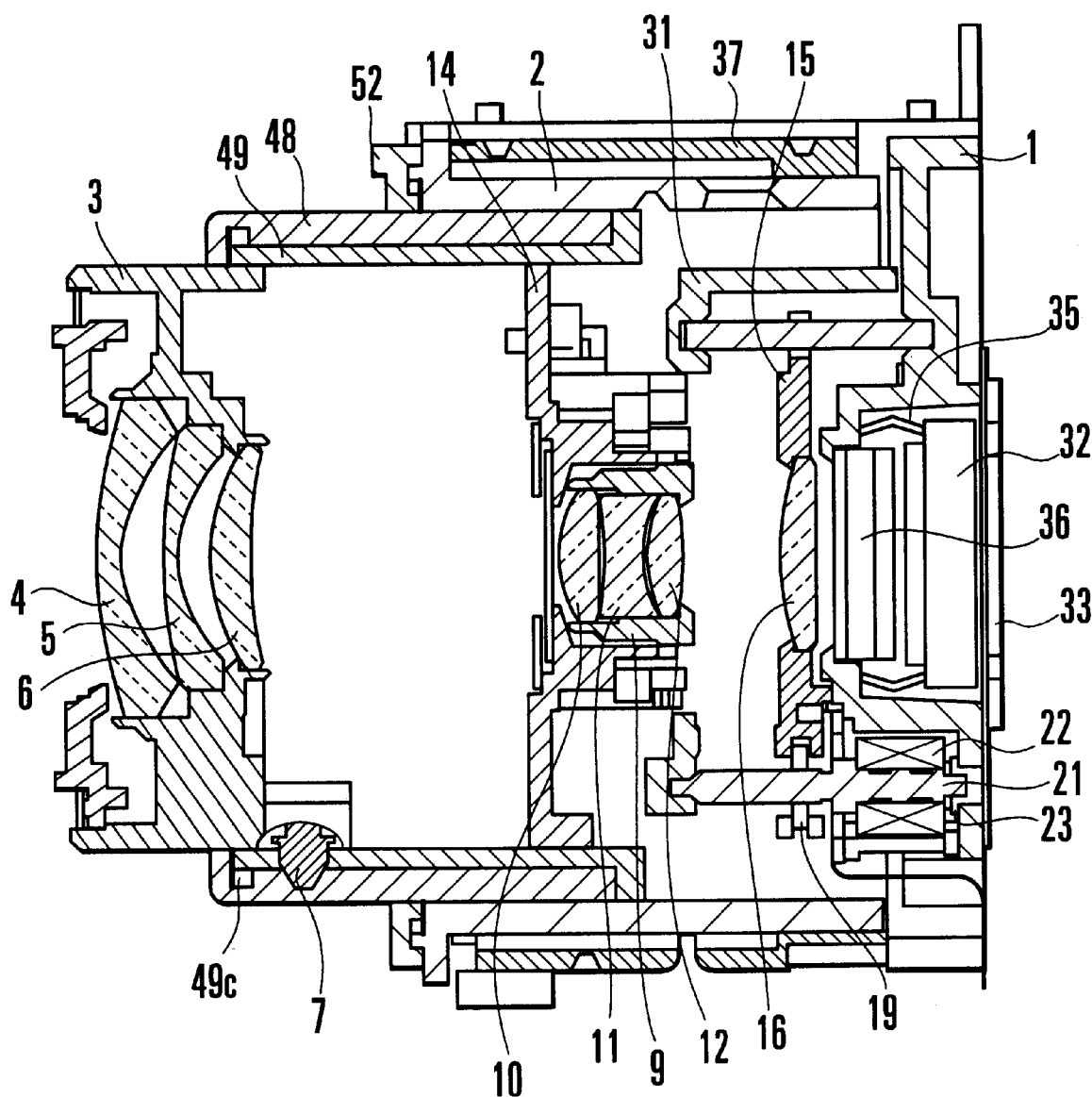
FIG. 3 is a sectional view taken across a central part of the lens barrel shown in FIG. 1 when the lens barrel is in a wide-angle position.
Figure 4:
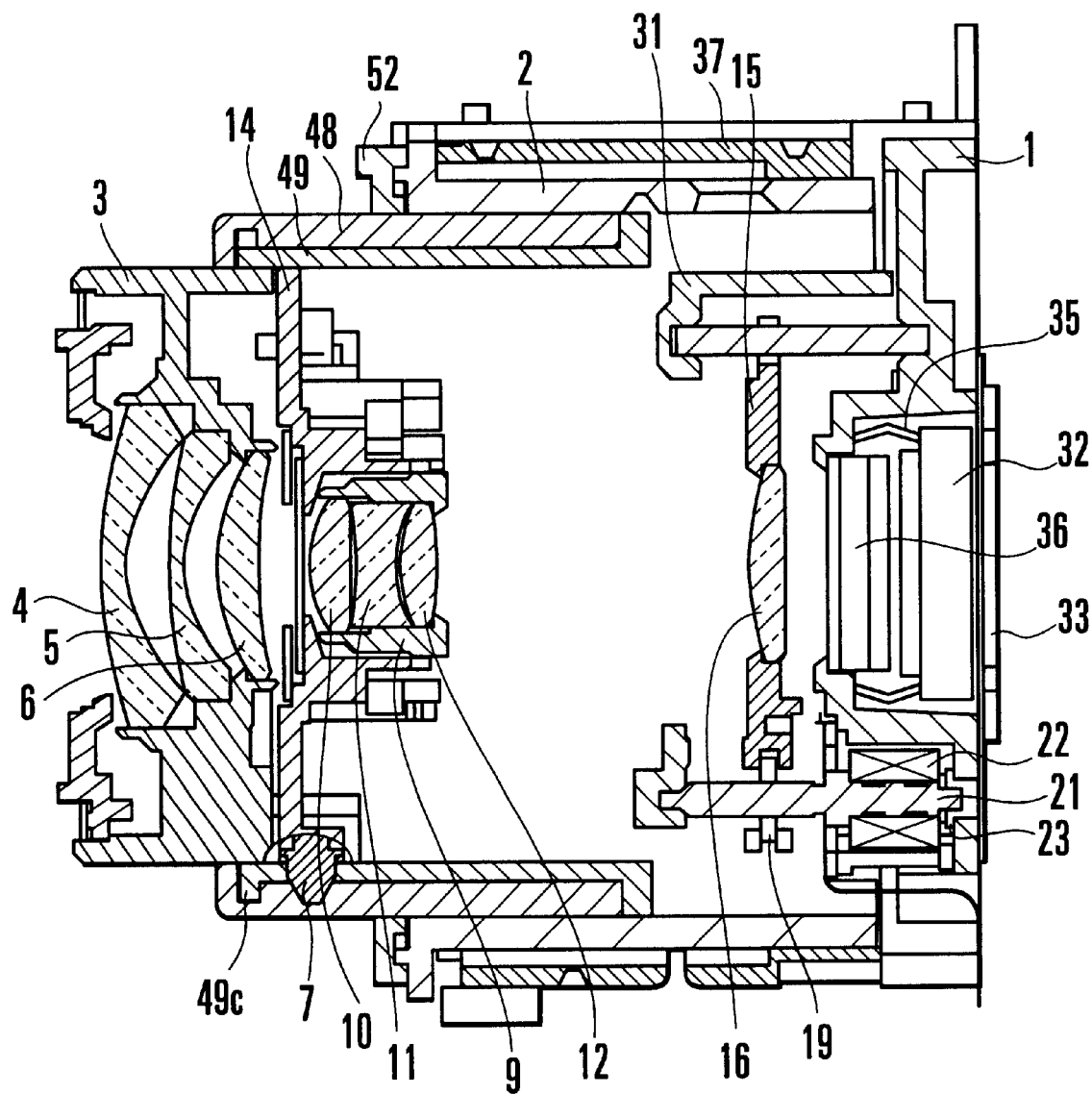
FIG. 4 is a sectional view taken across a central part of the lens barrel shown in FIG. 1 when the lens barrel is in a telephoto position.

FIG. 1 is an exploded perspective view showing a lens barrel part of a camera according to the embodiment of the invention. FIGS. 2, 3 and 4 are sectional views taken across a central part of the lens barrel shown in FIG. 1. Of these sectional views, FIG. 2 shows the lens barrel in a stowage position. FIG. 3 shows the lens barrel in a wide-angle position. FIG. 4 shows the lens barrel in a telephoto position.

Referring to FIGS. 1 to 4, a base 1 serving as a base part of a lens barrel unit constitutes a structural body of the lens barrel unit in conjunction with a fixed tube 2 which is secured to the front end of the base 1 with screws. A first-lens-group tube 3 holds the above-mentioned lenses 4, 5 and 6. Three follower pins 7 which have tapered fore end parts are press-fitted into the outer circumferential side surface of the first-lens-group tube 3. A cap 8 is secured by bonding to the front surface of the first-lens-group tube 3.

A second-lens-group tube 9, which holds the above-mentioned lenses 10, 11 and 12, is secured by bonding to a diaphragm base plate 14 of a diaphragm unit 13 integrally therewith.

Figure 5:
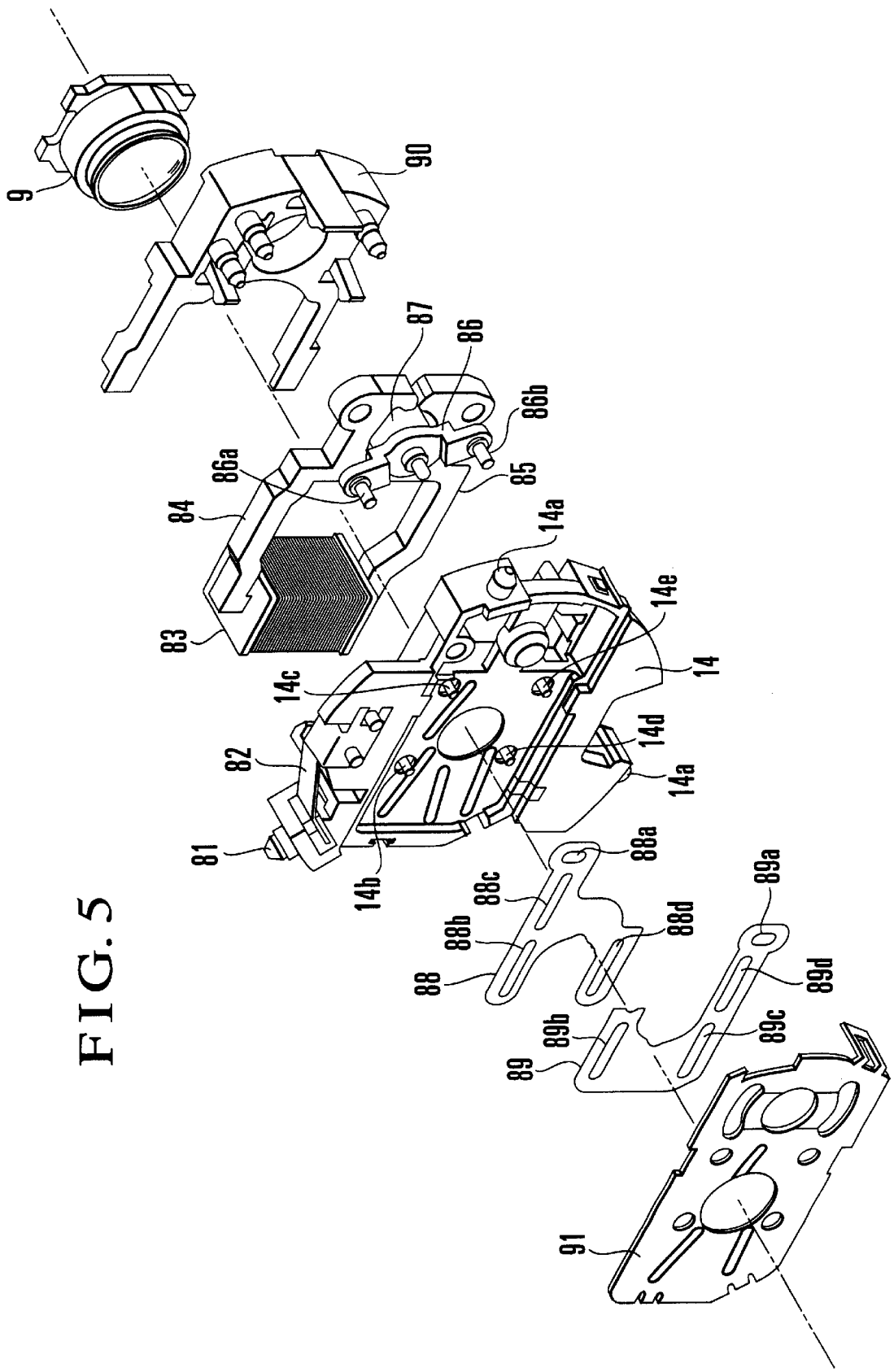
FIG. 5 is an exploded perspective view showing a diaphragm unit shown in FIG. 1.

FIG. 5 is an exploded perspective view showing the diaphragm unit 13. Referring to FIG. 5, three follower parts are formed on the peripheral part of the diaphragm base plate 14 at equal intervals. The three follower parts include two follower pats 14a having tapered fore end parts and formed integrally with the peripheral part and one movable follower 81 arranged to be axially movable.

The movable follower 81 is pushed on its rear end by an urging force of a leaf spring 82 to be offset toward one side of a mechanical clearance for maintaining a required rate of precision. The movable follower 81 is disposed in a position to be located uppermost among the three follower parts when the camera is at a normal posture. This positional arrangement makes the offsetting direction and the direction of gravity approximately coincide with each other to give a space saving effect and also to lessen a driving load.

A coil 83 is wound around a bobbin. A magnetic flux generated by energizing the coil 83 is arranged to generate through yokes 84 and 85 a magnetic rotating force at a magnet 87 which is formed integrally with an arm 86.

Diaphragm blades 88 and 89 are provided with linear slot parts 88b to 88d and 89b to 89d and are thus arranged to be slidable while being guided by shafts 14b to 14e provided on the diaphragm base plate 14. Two shaft parts 86a and 86b provided on the arm part of the arm 86 are inserted respectively in slot parts 88a and 89a of the diaphragm blades 88 and 89.

A cap 90 is arranged to fix the coil 83 and the yokes 84 and 85 in their positions between the cap 90 and the diaphragm base plate 14 and to swingably hold the arm 86 (and the magnet 87). A case 91 is arranged to prevent the diaphragm blades 88 and 89 from coming off.

The diaphragm unit 13 which is arranged in the above manner is disposed on the inner side of a rectilinear guide tube 49. For the purpose of having the diaphragm unit 13 disposed there, the coil 83 and the magnet 86, which need certain fixed amounts of space within the diaphragm unit 13, are separately allocated on two sides of an optical axis, and their longitudinal directions are thus arranged to coincide with the sliding direction of the diaphragm blades 88 and 89, in such a way that is suited for arranging the diaphragm unit 13 within a tubular part such as the rectilinear guide tube 49. Thus, the above arrangement of the diaphragm unit 13 contributes to a reduction in size of the camera.

Figure 7:
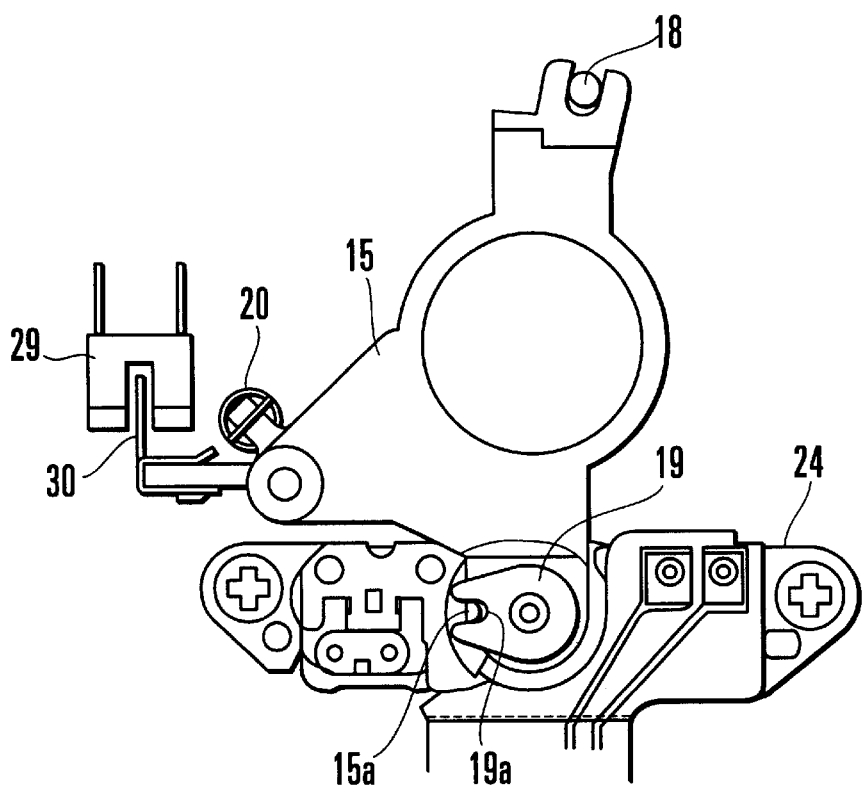
FIG. 7 is a front view showing a driving part for a third-lens-group tube shown in FIG. 1.

A third-lens-group tube 15, which holds the above-mentioned lens 16, is arranged to be guided by guide bars 17 and 18, to have its axial position restricted by a nut 19 having a female thread pinched by the arm part of the third-lens-group tube 15, and to be in a state of being biased by a tension spring 20 in the drawing-in direction of the lens barrel. As shown in FIG. 7, the nut 19 has a slit part 19a. A projection 15a which is provided on the third-lens-group tube 15 is fitted into the slit part 19a in such a way as to restrict the rotating motion of the third-lens-group tube 15.

A screw 21 is formed integrally with a magnet 22 to have a male thread part arranged to engage the female thread part of the nut 19. A bearing metal piece 23 is press-fitted into the base 1 and has one end of the screw 21 fitted therein in a rotatable manner.

Figure 6:
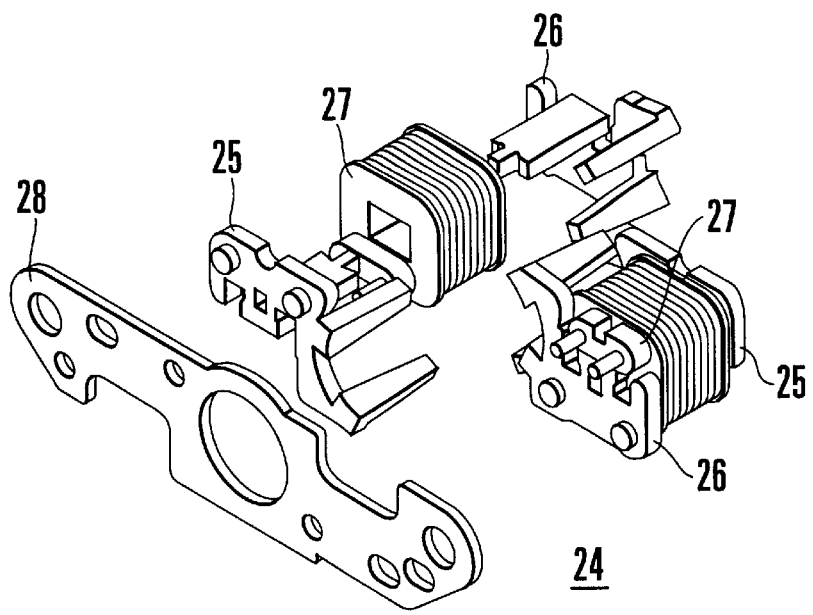
FIG. 6 is an exploded perspective view showing a stepping motor unit shown in FIG. 1.

A stepping motor 24 is arranged to drive and move the third-lens-group tube 15. As shown in FIG. 6, the stepping motor 24 has a pair of yokes 25 and 26 and coils 27 wound around bobbins arranged in two sets. The two sets of these parts are linearly allocated across the above-stated magnet 22. The stepping motor 24 is secured to the base 1 by attaching a yoke plate 28 to the base 1 with screws.

In FIG. 7, which shows the driving part of the third-lens-group tube 15, reference numeral 29 denotes a photo-interrupter. A slit plate 30 which is secured to the third-lens-group tube 15 integrally therewith is disposed in a position to be insertable and retractable into and from the slit part of the photo-interrupter 29.

A cap 31, which is secured to the base 1, has the fore ends of the guide bars 17 and 18 secured thereto and is arranged to rotatably hold the screw 21.

An image sensor 32 is secured by bonding to a holding plate 33, which is secured to the base 1 with screws. A flexible printed circuit board 34 is arranged to supply a photoelectrically-converted image signal to a signal processing circuit which will be described later herein. A dust-proof rubber piece 35 and an optical low-pass filter (LPF) 36 are both secured by bonding to the base 1.

Figure 8:
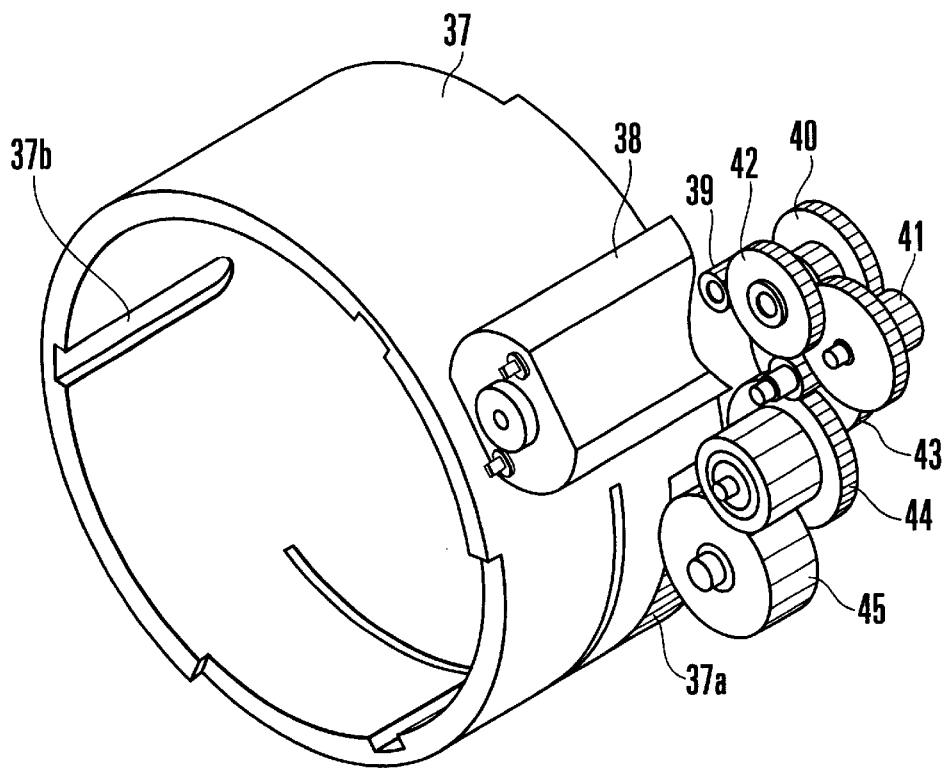
FIG. 8 is a perspective view showing a driving gear train for driving a driving ring shown in FIG. 1.

A driving ring 37 is rotatably fitted on the outer (circumferential) side of the fixed tube 2. The driving ring 37 has a gear part 37a formed at a part on the outer side thereof. As shown in FIG. 8, a DC motor 38 is arranged on the outer side of the driving ring 37 to have a pinion gear 39 firmly press-fitted to its output shaft. The driving force of the DC motor 38 is transmitted from the pinion gear 39 to the gear part 37a of the driving ring 37 through gears 40, 41, 42, 43, 44 and 45 one after another. These gears 40 to 45 are placed in gear boxes 46 and 47 and are secured to the base 1 in that state. The DC motor 38 is also secured to the gear box 46.

A moving cam ring 48 is fitted in on the inner side of the fixed tube 2. A rectilinear guide tube 49 is fitted in on the inner side of the moving cam ring 48.

Figure 9:
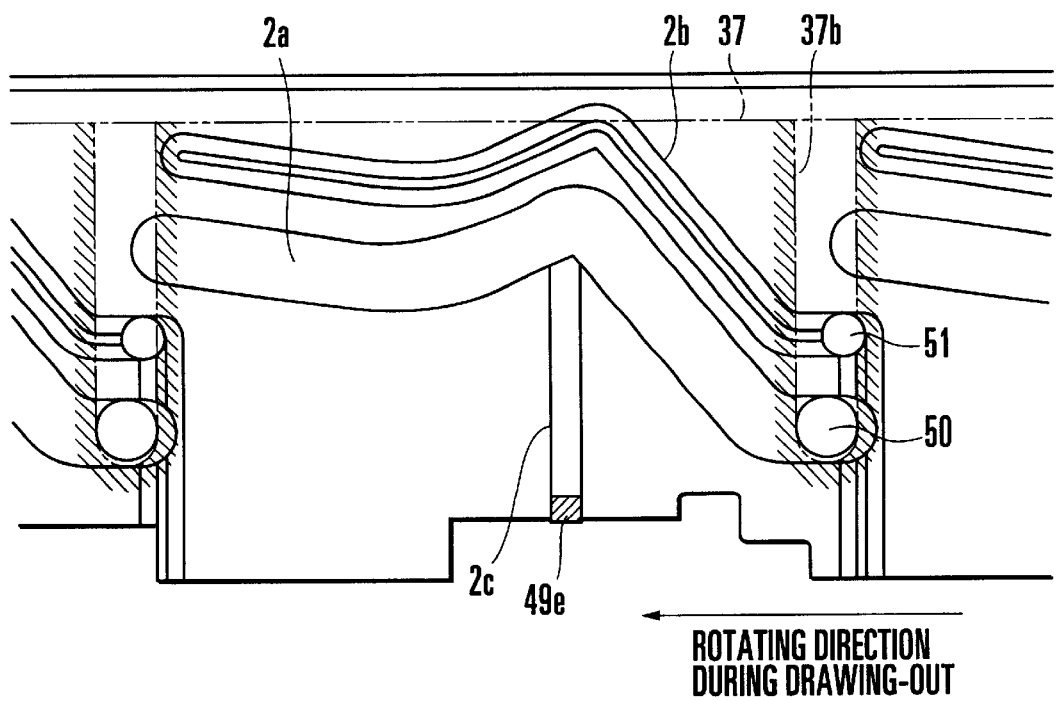
FIG. 9 is a development view showing the inner side of a fixed tube shown in FIG. 1.

On the outer side of the moving cam ring 48, are mounted three driving pins 50 and three follower pins 51 having tapered parts, at equal intervals. The driving pins 50 pierce through hole parts 2a of the fixed tube 2 to fittingly engage groove parts 37b which are provided on the inner side of the driving ring 37. The follower pins 51 has their fore-end tapered parts in sliding contact with tapered cam grooves 2b which are formed on the inner side of the fixed tube 2. FIG. 9 shows in an inner circumferential-surface development view how the driving pins 50 and the follower pins 51 are arranged.

FIG. 10 is a development view showing the inner circumferential side of the moving cam ring 48. As shown in FIG. 10, tapered cam grooves 48a and 48b are formed on the inner circumferential side of the moving cam ring 48. Followers 7 which are provided on the first-lens-group tube 3 and followers 14a (or 81) which are formed on the diaphragm base plate 14 are in sliding contact with the tapered cam grooves 48a and 48b.

At the same time, the side surfaces of the followers 7 and 14a are fittingly engaging the rectilinear grooves 49a and 49b of the rectilinear guide tube 49, so that the positions of the followers 7 and 14a in the direction of rotation are restricted. The first-lens-group tube 3 and the diaphragm unit 13 are thus restrained from rotating and are allowed to make only rectilinear motions.

Projections 49c formed at the front part on the outer circumferential side of the rectilinear guide tube 49 are in abutting contact with groove parts 48c which are provided on the inner side of the moving cam ring 48. Meanwhile, a flange part 49 which is formed at the rear end of the rectilinear guide tube 49 is abutting on the end part of the moving cam ring 48. By this arrangement, the rectilinear guide tube 49 is restrained from moving in the optical axis direction with respect to the moving cam ring 48. At the same time, as shown in FIG. 9, rear projections 49e which are provided at the rear end of the rectilinear guide tube 49 fittingly engage the linear groove parts 2c on the inner side of the fixed tube 2 in a state of being allowed to make a linear motion but being restrained from moving in the direction of rotation.

As shown in FIGS. 1 to 6, in the present embodiment, the stepping motor 24 is arranged at about the same height as the height obtained with the LPF 36 superposed on the image sensor 32 and is arranged to linearly extend along one side of the combination of the LPF 36 and the image sensor 32. The screw 21 and the magnet 22 are disposed near to the center of the above-stated one side. This arrangement of the stepping motor 24 enables the third-lens-group tube 15 to be formed in a flat-plate shape and also enables tubular parts, such as the moving cam ring 48 and the rectilinear guide tube 49, to be closely allocated, so that the lens barrel of the camera can be made compact.

The longitudinal direction of the diaphragm unit 13 and the longitudinal direction of the stepping motor 24 are arranged to coincide with each other. By virtue of this arrangement, the guide bars 17 and 18 and the screw 21 can be allocated around the diaphragm unit 13 and within a vacant space inside the moving cam ring 48. The arrangement thus permits the reduction of the total length of the lens barrel to be obtained with the lens barrel set in the stowage position, as shown in FIG. 2.

Referring to FIGS. 1 to 4, a cap 52 is arranged to hold a dust-proof sheet 53 between the fixed tube 2 and the cap 52. The cap 52 has rail parts 52a and 52b arranged on a front surface thereof to guide a barrier 54 which will be described later. Another dust-proof sheet 55 is inserted in the groove part 48c of the moving cam ring 48.

A linear sensor 56 is secured to the base 1 with screws or the like. The circuit arrangement of the linear sensor 56 is a variable resistor as shown in FIG. 11(a). As shown in FIG. 11(b), when a predetermined voltage is applied between terminals A and C shown in FIG. 11(a), the output of a terminal B linearly varies accordingly as a sliding piece 56a of the linear sensor 56 slides. A lever 57 is arranged to pinch and carry the sliding piece 56a by its arm part 57a and to be guided by a guide bar 58. The lever 57 is provided with a follower part 57b which has a tapered part at its fore end. The side surface of the lever 57 is fittingly engaging a slot part 1a of the base 1. A spring 59 urges the lever 57 to move toward one side. FIG. 12 shows these parts as viewed from the front side of them.

Figure 13:
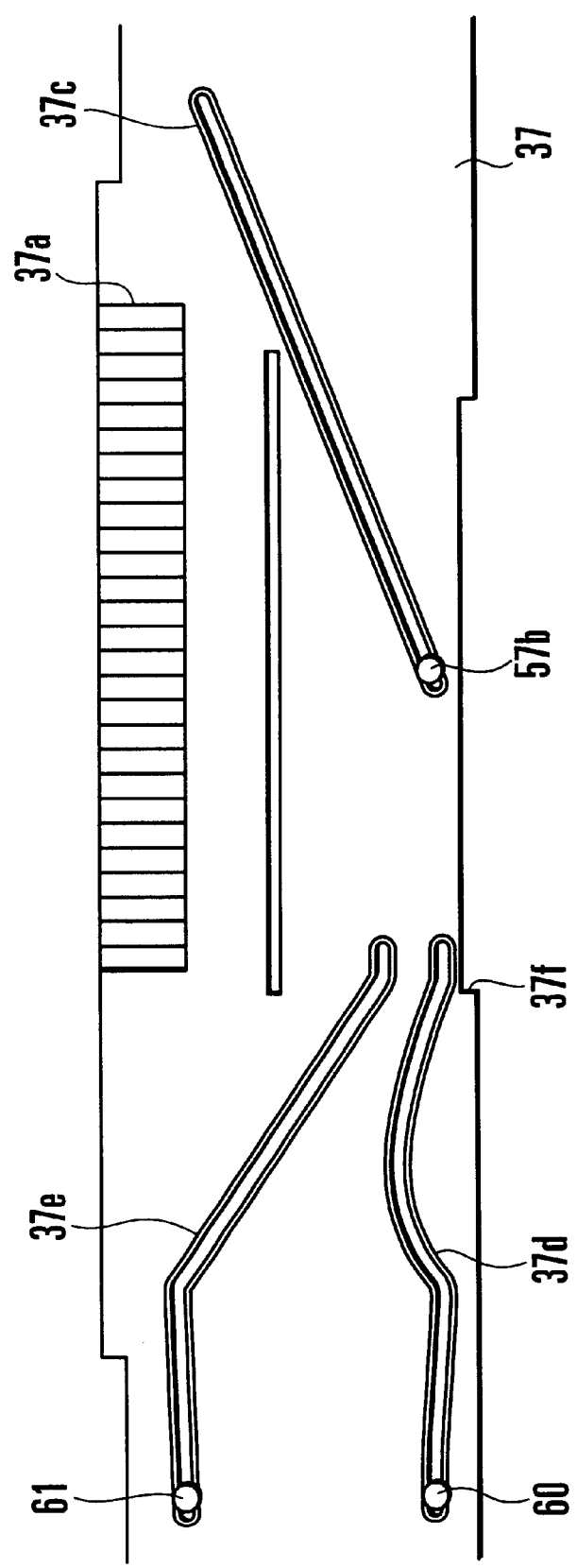
FIG. 13 is a development view showing the outer side of the driving ring shown in FIG. 1.

FIG. 13 is a development view of the outer side of the driving ring 37. As shown in FIG. 13, the follower part 57b of the lever 57 is in sliding contact with the linear cam groove 37c of the driving ring 37. Tapered cam grooves 37d and 37e are provided for zoom-driving a viewfinder lens (not shown). A follower part 60 is arranged integrally with a compensator lens (not shown). A follower part 61 is arranged integrally with a variator lens (not shown). The follower parts 60 and 61 are in sliding contact respectively with the cam grooves 37d and 37e.

Figure 14A:
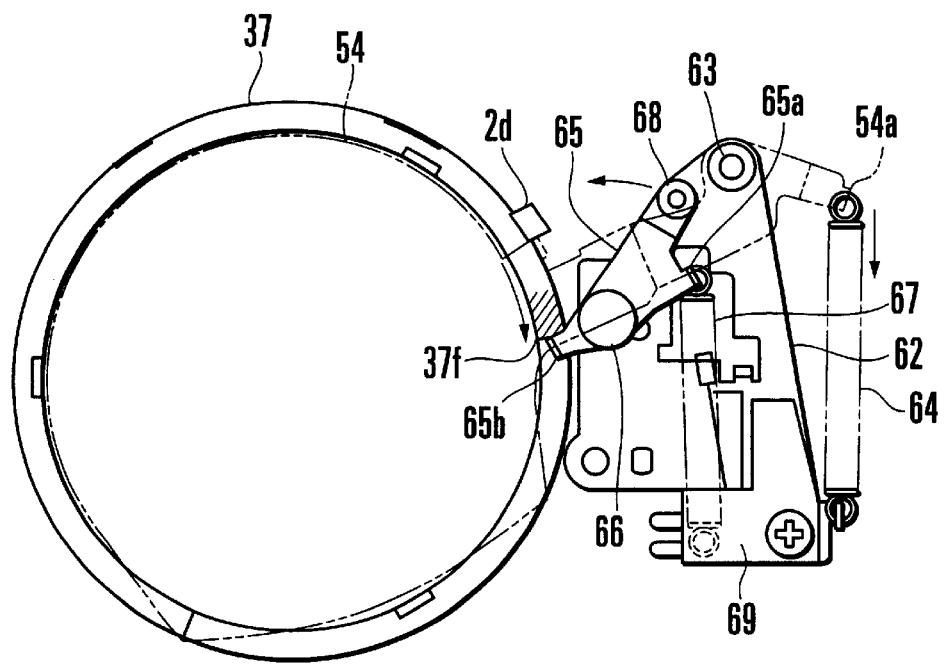
FIGS. 14(a) and 14(b) are diagrams for explaining an opening-and-closing mechanism for a barrier shown in FIG. 1.
Figure 14B:
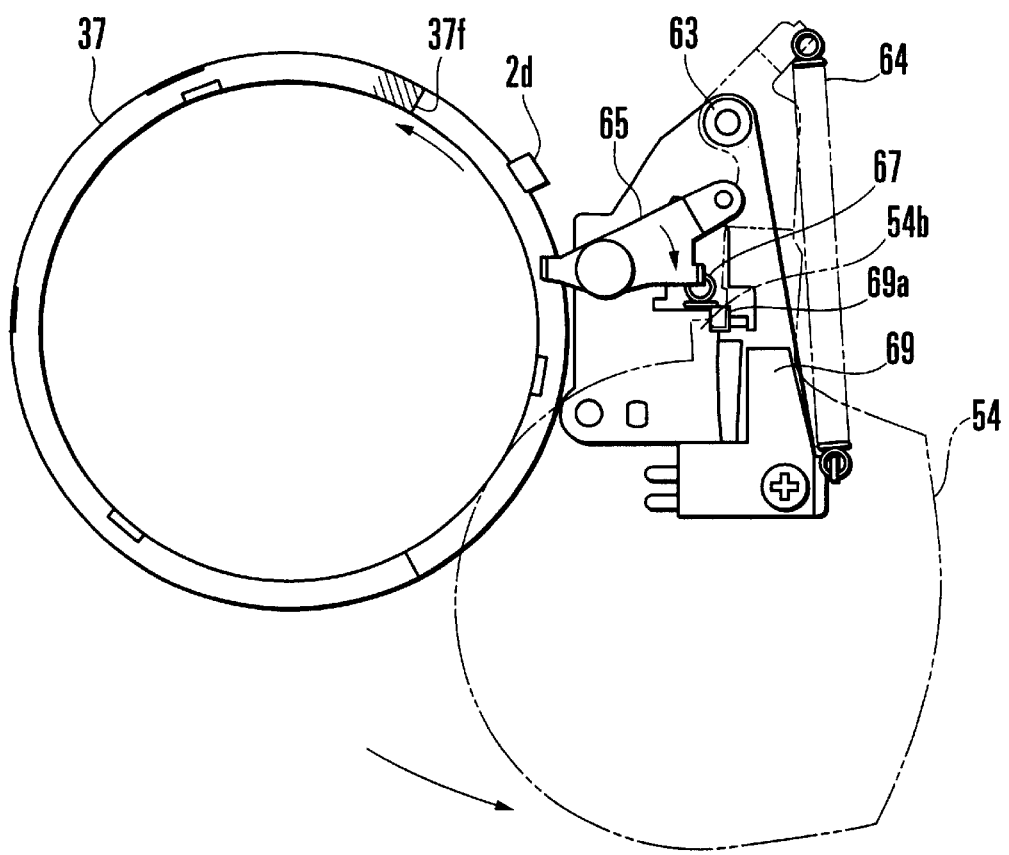

Referring to FIG. 1 and FIGS. 14(a) and 14(b), the barrier 54 is supported to be rotatable around a shaft 63 mounted on a barrier base 62. The barrier 54 is urged by a closing spring 64 hooked on its hook part 54a to move clockwise as viewed from the front of the camera. A barrier driving lever 65 is supported to be rotatable around a shaft 66 mounted on the barrier base 62. The barrier driving lever 65 is urged to move clockwise by an opening spring 67 which is hooked on a hook part 65a of the barrier driving lever 65.

Here, the urging forces of the two springs 64 and 67 are set as "the closing springs 64 << the opening spring 67". A shaft 68 is mounted at one end of the barrier driving lever 65 in a position corresponding to one side face of the barrier 54. A leaf switch 69 which is formed by integral molding is secured to the barrier base 62 with screws. The barrier base 62 is secured to the base 1 with screws.

FIG. 14(a) shows the state where the barrier 54 is closed. In this state, a stepped part 37f of the driving ring 37 pushes a bent part 65b of the barrier driving lever 65 to cause the barrier driving lever 65 to be swung counterclockwise against the urging force of the opening spring 67 and to be locked at that position. The barrier 54 is, in the meantime, caused to swing in the direction of closing by the urging force of the closing spring 64 and to be in a closed state with its bent part 54b abutting on a stopper part 2d of the fixed tube 2.

Figure 15:
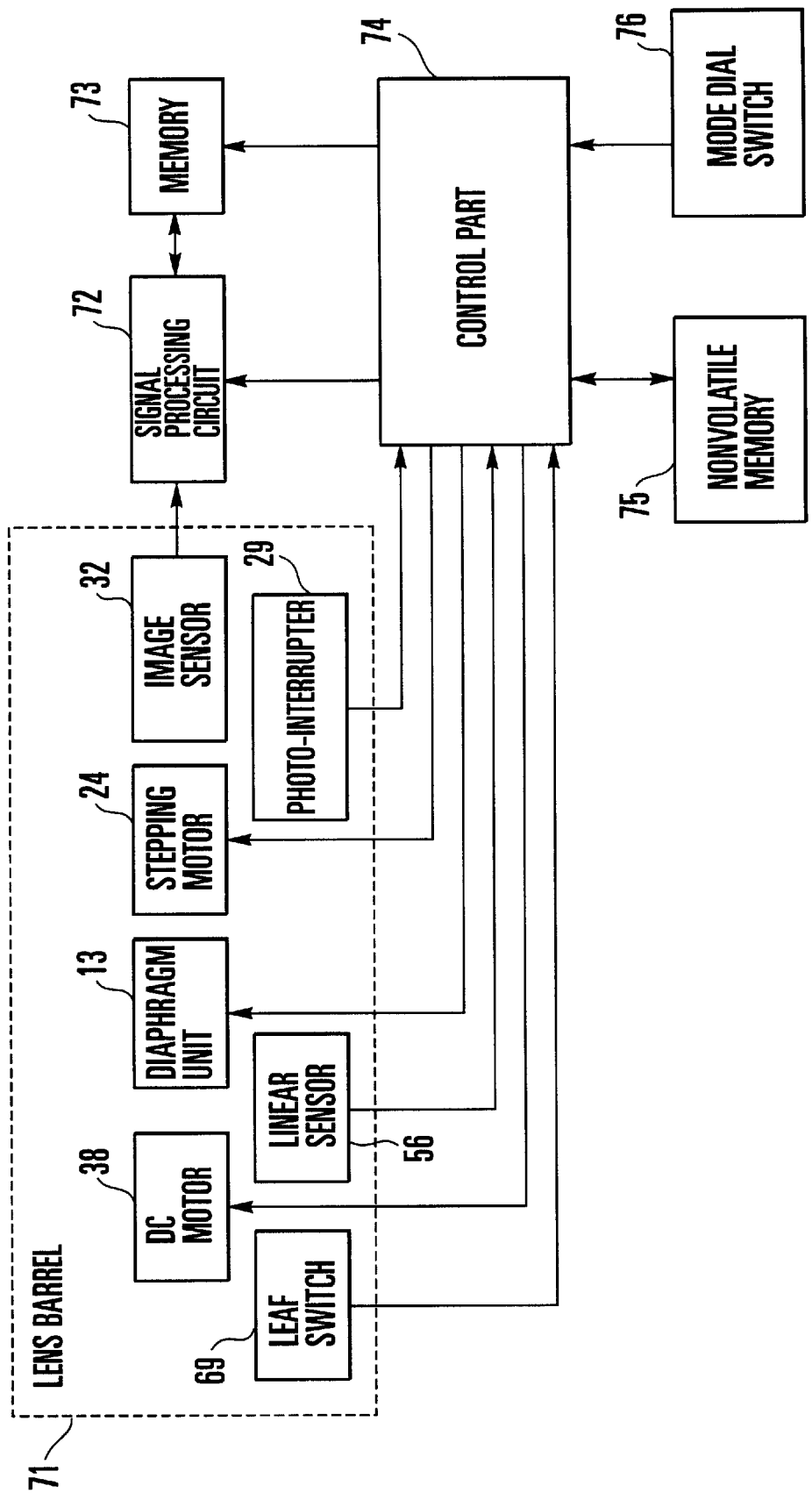
FIG. 15 is a block diagram showing the electrical arrangement of the camera shown in FIG. 1.

FIG. 15 is a block diagram showing the electric connection arrangement of the camera according to the embodiment of the invention. In FIG. 15, the lens barrel 71 is the same as the lens barrel that has been described above, and the components of the lens barrel 71 are indicated by the same reference numerals as those used in the foregoing description.

Referring to FIG. 15, an image signal obtained through photoelectric conversion by the image sensor 32 is supplied to a signal processing circuit 72 for a color-conversion process, a gamma correction process, etc. After these processes, the image signal is recorded in a memory 73 which is, for example, a card medium or the like. A control part 74, which controls the whole camera, is arranged to control the stepping motor 24, the DC motor 38 and the diaphragm unit 13 while watching the outputs of the linear sensor 56, the photo-interrupter 29, the leaf switch 69, etc., which are disposed within the lens barrel 71, and also to control the signal processing circuit 72 and the memory 73.

A nonvolatile memory 75, which is, for example, an EEPROM or the like, is arranged to permit electrical erasure and recording.

A mode dial switch 76 is arranged to permit selection and setting of various operation modes, such as turning-off of the power supply, a photo-taking mode, a reproduction mode, a PC connection mode, etc.

The lens barrel of the camera arranged according to the present embodiment as described above operates as follows.

When the DC motor 38 is driven, the driving ring 37 is caused to rotate through the gears 39 to 45 (see FIG. 8). The driving pins 50 of the moving cam ring 48 which pierce through the hole parts 2a of the fixed tube 2 are fittingly engaging the linear groove parts 37b formed on the inner side of the driving ring 37 to extend in the optical axis direction as mentioned above. The rotation of the driving ring 37, therefore, causes the moving cam ring 48 to rotate through the driving pins 50. However, since the follower pins 51 of the moving cam ring 48 are engaging the cam grooves 2b of the fixed tube 2, the moving cam ring 48 is allowed to move in the optical axis direction along the cam grooves 2b of the fixed tube 2 (see FIG. 9).

The movement of the moving cam ring 48 in the optical axis direction causes the rectilinear guide tube 49 to move also in the optical axis direction integrally with the moving cam ring 48. Then, since the projections 49e on the outer circumferential side of the rectilinear guide tube 49 is under restriction of the groove parts 2c of the fixed tube 2, the rectilinear guide tube 49 is allowed to move only in the optical axis direction without rotating.

When the moving cam ring 48 rotates, the first-lens-group tube 3 and the second-lens-group tube 9 which is secured to the diaphragm unit 13 relatively move in the optical axis direction respectively along the grooves 49a and 49b of the rectilinear guide tube 49 according to the lifts of the cams 48a and 48b of the moving cam ring 48 (FIG. 10).

FIGS. 16(a) to 16(e) are diagrams showing only the loci of the cam parts of the lens barrel. FIG. 16(a) shows the cam locus of the fixed tube 2. FIG. 16(b) shows the cam locus of the moving cam tube 48 for the first-lens-group tube 3. FIG. 16(c) shows the cam locus of the moving cam ring 48 for the second-lens-group tube 9. FIG. 16(d) shows the locus of movement of the first-lens-group tube 3, which is the sum of the loci shown in FIGS. 16(a) and 16(b). FIG. 16(e) shows the locus of movement of the second-lens-group tube 9, which is the sum of the loci shown in FIGS. 16(a) and 16(c).

In each of FIGS. 16(a) to 16(e), a point W represents a wide-angle end position, a point T represents a telephoto end position, and a point S represents a stowage position. Each cam is provided with a flat area extending from the stowage position S to a position B. According to the loci shown in FIGS. 16(a) to 16(e), a change-over between the stowage position and a photo-taking position (S - W) and a zooming action in the photo-taking range (W -T) are carried out by driving the DC motor 38.

When the driving ring 37 rotates, a viewfinder lens (not shown) is moved in the optical axis direction along the cam grooves 37d and 37e through the followers 60 and 61 and, as mentioned above, acts in association with the zooming action of the lens barrel.

At the same time, the lever 57 moves along the cam groove 37c in the optical axis direction to displace the sliding piece 56a of the linear sensor 56 and thus to vary the output of the linear sensor 56 as shown in FIG. 11(b). Thus, every zoom position is successively detectable through the output of the linear sensor 56.

As shown in FIG. 16(d), the reciprocating motion of the first-lens-group tube 3 between the wide-angle end position W and the telephoto end position T draws a locus convex toward the image side. Therefore, each of the three cams as shown in FIGS. 16(a) to 16(c) is arranged to have a non-linear cam part between the wide-angle end position W and the telephoto end position T. By virtue of this arrangement, the inclination of each cam can be minimized for reduction in driving load.

Further, by arranging each of the cam of the fixed tube 2 shown in FIG. 16(a) and the cam of the moving cam ring 48 for the first-lens-group tube 3 shown in FIG. 16(b) to have a maximal value between the stowage position S and the wide-angle end position W, the amount of drawing-out of the first-lens-group tube 3 can be dispersed to the two cams shown in FIGS. 16(a) and 16(b). By this arrangement, the total length of the fixed tube 2 and that of the moving cam ring 48 can be reduced for compact arrangement of the camera.

As mentioned above with reference to FIG. 14(a), the stepped part 37f of the driving ring 37 locks the barrier driving lever 65 when the lens barrel is in the stowage position. However, when the driving ring 37 rotates, the barrier driving lever 65 is unlocked to allow the barrier driving lever 65 to be swung clockwise by the urging force of the opening spring 67. The barrier driving lever 65 thus comes to push the side surface of the barrier 54 through the shaft 68.

Since the urging force of the closing spring 64 is weaker than the urging force of the opening spring 67 as mentioned above, the barrier 54 is caused to be swung counterclockwise by the barrier driving lever 65 into an open position as shown in FIG. 14(b). At this time, the bent part 54b of the barrier 54 pushes a contact 69a of the leaf switch 69 to turn on the leaf switch 69. The opening and closing actions on the barrier 54 are thus arranged to be carried out within the flat areas of the cam loci, i.e., between the positions S and B, shown in FIGS. 16(a) to 16(e).

When the stepping motor 24 is driven, the screw 21 is caused to rotate through the magnet 22. Since the nut 19 is under the restriction of the projection 15a of the third-lens-group tube 15 as mentioned above, the nut 19 moves in the optical axis direction. Then, following the movement of the nut 19, the third-lens-group tube 15 also moves in the optical axis direction to perform a focus adjusting action. Within the stroke of the action of the third-lens-group tube 15, the slit plate 30 is either inserted into or retracted from the slit part of the photo-interrupter 29 to change the output of the photo-interrupter 29. At this time, a counter for the stepping motor 24 is reset accordingly.

Figure 17A:
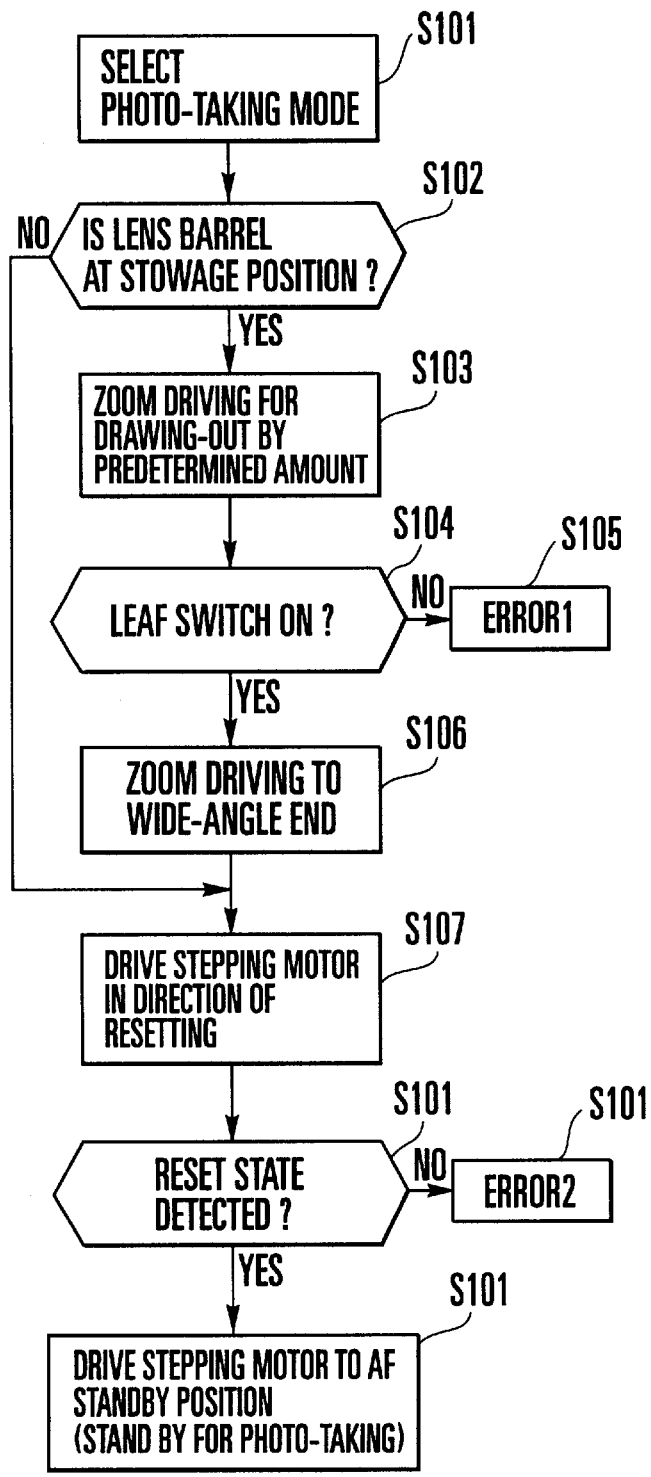
FIGS. 17(a) and 17(b) are flow charts showing sequences of driving actions on the lens barrel shown in FIG. 1.
Figure 17B:
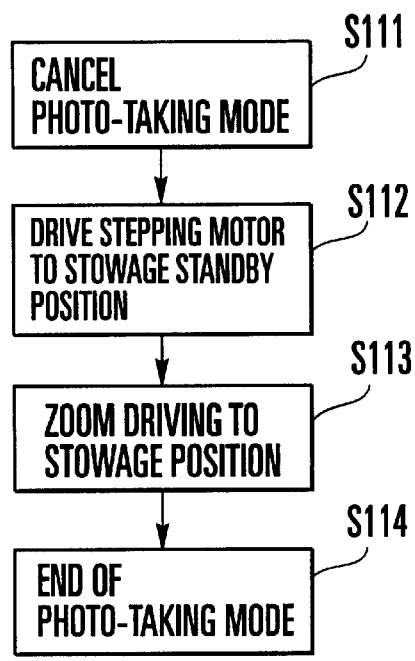

FIGS. 17(a) and 17(b) are flow charts showing the actions of the camera. FIG. 17(a) shows the actions to be performed in causing the camera to start operating. At a step S101 of FIG. 17(a), the mode dial switch 76 is operated to select a photo-taking mode. At a step S102, the control part 74 checks the output of the linear sensor 56 to find whether the zoom position of the lens barrel 71 is the stowage position or the photo-taking position between the wide-angle end position and the telephoto end position.

If the zoom position is found to be the photo-taking position between the wide-angle end position and the telephoto end position, the flow of operation proceeds to a step S107. If the zoom position is found to be the stowage position, the flow proceeds from the step S102 to a step S103. At the step S103, the DC motor 38 is driven by a predetermined amount in the direction of drawing out the lens barrel. This predetermined amount corresponds to the area between the positions S and B shown in each of FIGS. 16(a) to 16(e). At a step S104, the zoom (drawing-out) driving action is temporarily brought to a stop to make a check to find if the leaf switch 69 is in an on-state. If so, the flow proceeds to a step S106. If not, the off-state of the leaf switch 69 is considered to indicate occurrence of some error, and the flow proceeds to a step S105. At the step S105, a warning display or the like is made without further performing the zoom driving action and without further driving the stepping motor 24. At the step S106, the zoom driving action is further carried on to draw out the lens barrel to the wide-angle end position.

At the step S107, when the drawing-out of the lens barrel up to the wide-angle end position by the zoom driving action is completed, the stepping motor 24 is driven in the direction of the change-over position of the photo-interrupter 29. Upon detection of the change-over of the output of the photo-interrupter 29, the stepping motor 24 is brought to a stop at that position, and the counter for the stepping motor 24 is reset. At a step S108, a check is made for the reset state of the counter. If the change-over is not detected and the counter is not reset due to some reason, the flow proceeds to a step S109. At the step S109, some error is considered to have occurred and, for example, a warning display or the like is made. At the same time, the further driving of the stepping motor 24 and the further zoom driving are inhibited. If the counter is found at the step S108 to have been reset, the flow proceeds to a step S110. At the step S110, the stepping motor 24 is driven further to a standby position where a focusing (AF) action can be allowed to start. The camera is thus set in the standby state in which a photo-taking operation can be performed.

FIG. 17(b) shows the actions of the camera to be performed in terminating the photo-taking mode. At a step S111, when the mode dial switch 76 is operated to select any operation other than the photo-taking mode, such as the turning-off of the power supply, the reproduction mode or the like, the flow proceeds to a step S112. At the step S112, the stepping motor 24 is first driven to cause the third-lens-group tube 15 to move to a stowage standby position (stowage completion position). This position is adjusted beforehand in a manufacturing process for each individual camera, and information on this position is stored in the nonvolatile memory 75 as the amount of count from the position where the counter for the stepping motor 24 has been reset. At the next step S113, the DC motor 38 is driven to move the lens barrel to the stowage position. At a step S114, the photo-taking mode is terminated.

After termination of the photo-taking mode, there is obtained a state as shown in FIG. 2. In the case of the present embodiment, as shown in FIGS. 2 to 4, the driving stroke of the third-lens-group tube 15 at the photo-taking position overlaps with the stowage position of the second-lens-group tube 9 shown in FIG. 2.

Therefore, in starting a photo-taking operation as described above, the zoom driving action is first performed. In stowing the lens barrel, the third-lens-group tube 15 is always first moved to the stowage standby position. By virtue of such a control arrangement, lens-group tubes can be prevented from colliding with each other, so that spacing distances among the lens-group tubes in the stowage position can be arranged to be extremely short. Besides, the arrangement for inhibiting the driving of the DC motor 38 and the driving of the stepping motor 24 in the event of occurrence of a trouble in the reset action on the third-lens-group tube 15 effectively prevents the camera from being damaged.

Further, the change-over position of the photo-interrupter 29 individually varies to a considerable extent in general. However, the above-stated arrangement for storing information on the stowage standby position in the nonvolatile memory 75 permits stowing the lens barrel within an extremely limited space, while preventing the third-lens-group tube 15 from colliding with the base 1.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the above-described embodiment, the first-lens-group tube 3, the second-lens-group tube 9 and the third-lens-group tube 15 are arranged not to simultaneously move in drawing out the lens barrel to the photo-taking position or in drawing in the lens barrel to the stowage position. However, according to the invention, the first-lens-group tube 3, the second-lens-group tube 9 and the third-lens-group tube 15 may be made to simultaneously move, if such a sequence of operations as to prevent those tubes from colliding with each other is adopted.

Further, in the above-described embodiment, a rear focus zoom lens is employed as an optical arrangement. However, the invention is applicable also to another zoom arrangement or to a focal-length changeover optical arrangement other than the zoom arrangement.

Further, in the above-described embodiment, an optical system composed of three lens groups is employed. However, the invention is applicable also to an optical system composed of a plurality of, other than three, lens groups, such as two or four lens groups.

Further, in the above-described embodiment, an optical arrangement is composed of a magnification-varying lens group and a focusing lens group. However, the invention is applicable also to an optical arrangement composed of other lens groups or to another optical unit arrangement including a filter or the like.

Further, the software arrangement and the hardware arrangement in the above-described embodiment may be adaptively replaced with each other.

Further, in the invention, the technical elements of the above-described embodiment may be combined with each other according to necessity.

Further, the invention also applies to cases where each claim or the whole or a part of the arrangement of the embodiment constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses, such as a lens barrel, other types of apparatuses, and, moreover, to apparatuses adapted for the cameras, the image pickup apparatuses, optical apparatuses and the other types of apparatuses, and elements constituting the above-mentioned apparatuses.

What is claimed is:

1. An apparatus comprising:
   (A) an optical unit; and
   (B) an operating device which brings said optical unit to a usage start position by drawing in said optical unit after drawing out said optical unit from a stowage position, said operating device causing a focal-length varying operation to be performed by further drawing in said optical unit from the usage start position.

2. An apparatus according to claim 1, wherein said optical unit includes a lens for varying magnification.

3. An apparatus according to claim 1, wherein said operating device includes a motor.

4. An apparatus according to claim 1, wherein said operating device includes a cam.

5. An apparatus according to claim 1, wherein said operating device moves said optical unit by a combination of a plurality of cams.

6. An apparatus according to claim 1, further comprising:
   an image pickup device for converting a light flux taken in through said optical unit into an electrical signal to perform photo-taking.

7. An apparatus according to claim 1, further comprising:

a protection cover for an optical system constituted by said optical unit, said protection cover performing an opening operation during a period for which said optical unit is moved from the stowage position to the usage start position.

8. An apparatus according to claim 1, wherein said optical unit includes a camera.

9. An apparatus according to claim 1, wherein said optical unit includes a lens barrel.

10. An apparatus according to claim 1, wherein said optical unit includes an optical apparatus.

11. An apparatus comprising:

(A) an optical unit; and (B) an operating device which brings said optical unit to a usage start position by drawing out said optical unit from a stowage position, said operating device causing a focal-length varying operation to be performed by drawing in said optical unit from the usage start position.

12. An apparatus according to claim 11, wherein said optical unit includes a lens for varying magnification.

13. An apparatus according to claim 11, wherein said operating device includes a motor.

14. An apparatus according to claim 11, wherein said operating device includes a cam.

15. An apparatus according to claim 11, wherein said operating device moves said optical unit by a combination of a plurality of cams.

16. An apparatus according to claim 11, further comprising:

an image pickup device for converting a light flux taken in through said optical unit into an electrical signal to perform photo-taking.

17. An apparatus according to claim 11, further comprising:

a protection cover for an optical system constituted by said optical unit, said protection cover performing an opening operation during a period for which said optical unit is moved from the stowage position to the usage start position.

18. An apparatus according to claim 11, wherein said optical unit includes a camera.

19. An apparatus according to claim 11, wherein said optical unit includes a lens barrel.

20. An apparatus according to claim 11, wherein said optical unit includes an optical apparatus.

* * * * *